United States Patent [19]
Brady, III et al.

[11] Patent Number: 5,317,036
[45] Date of Patent: May 31, 1994

[54] GAS PHASE POLYMERIZATION REACTIONS UTILIZING SOLUBLE UNSUPPORTED CATALYSTS

[75] Inventors: Robert C. Brady, III, Morristown; Frederick J. Karol, Belle Mead; Timothy R. Lynn, Hackettstown; Robert J. Jorgensen; Sun-Chueh Kao, both of Belle Mead; Eric P. Wasserman, Hopewell, all of N.J.

[73] Assignee: Union Carbide Chemicals & Plastics Technology Corporation, Danbury, Conn.

[21] Appl. No.: 962,119

[22] Filed: Oct. 16, 1992

[51] Int. Cl.$^5$ ............................................. C08F 4/642
[52] U.S. Cl. ..................................... 523/223; 523/330; 523/333; 526/158; 526/351; 526/352; 526/352.2; 526/901
[58] Field of Search ..................... 523/223, 330, 333; 526/158, 351, 352, 352.2, 901

[56] References Cited

U.S. PATENT DOCUMENTS

| | | | |
|---|---|---|---|
| 3,023,203 | 2/1962 | Dye | 260/94.9 |
| 3,221,002 | 11/1965 | Orzechowski et al. | 260/94.9 |
| 3,231,550 | 1/1966 | Manylk et al. | 260/88.2 |
| 3,242,099 | 3/1966 | Manylk et al. | 252/429 |
| 3,256,263 | 6/1966 | Wisseroth et al. | 260/94.9 |
| 3,625,932 | 12/1971 | Green | 260/92.8 |
| 3,779,712 | 12/1973 | Calvert et al. | 23/288 E |
| 3,876,602 | 4/1975 | Calvert et al. | 260/94.9 P |
| 4,124,532 | 11/1978 | Giannini et al. | 252/429 |
| 4,302,565 | 11/1981 | Goeke | 526/88 |
| 4,302,566 | 11/1981 | Karol et al. | 526/125 |
| 4,404,344 | 9/1983 | Sinn et al. | 526/160 |
| 4,530,914 | 7/1985 | Ewen | 502/113 |
| 4,588,790 | 5/1986 | Jenkins, III et al. | 526/70 |
| 4,988,783 | 1/1991 | Beran et al. | 526/129 |
| 5,001,205 | 3/1991 | Hoel | 526/129 |
| 5,001,244 | 3/1991 | Welborn, Jr. | 526/129 |
| 5,026,798 | 6/1991 | Canich | 526/127 |
| 5,041,584 | 10/1991 | Crapo | 556/179 |
| 5,055,438 | 10/1991 | Canich | 502/117 |
| 5,057,475 | 10/1991 | Canich | 502/104 |
| 5,093,415 | 3/1992 | Brady, III et al. | 525/53 |

FOREIGN PATENT DOCUMENTS

| | | |
|---|---|---|
| 0232595 | 8/1987 | European Pat. Off. . |
| 0277003 | 8/1988 | European Pat. Off. . |
| 0277004 | 8/1988 | European Pat. Off. . |
| 0416815 | 3/1991 | European Pat. Off. . |
| 0420436 | 4/1991 | European Pat. Off. . |
| 0426637 | 5/1991 | European Pat. Off. . |
| 0426638 | 5/1991 | European Pat. Off. . |
| 0427697 | 5/1991 | European Pat. Off. . |
| 1248951 | 10/1971 | United Kingdom . |
| 1248952 | 10/1971 | United Kingdom . |
| 1248953 | 10/1971 | United Kingdom . |
| 2105355 | 3/1983 | United Kingdom . |

Primary Examiner—Joseph L. Schofer
Assistant Examiner—Tom Weber
Attorney, Agent, or Firm—M. N. Reinisch

[57] ABSTRACT

Gas phase polymerization processes are disclosed which utilize unsupported soluble transition metal coordination catalysts. The catalysts are introduced into the reactor as a solution.

20 Claims, 2 Drawing Sheets

GAS PHASE POLYMERIZATION REACTIONS UTILIZING SOLUBLE UNSUPPORTED CATALYSTS

FIELD OF THE INVENTION

This invention generally pertains to the field of gas phase polymerization reactions. More particularly, the present invention is directed to the utilization of soluble, unsupported transition metal catalysts and their co-catalysts in such gas phase polymerization reactions.

BACKGROUND OF THE INVENTION

Gas phase reactions for the production of olefin polymers are well known in the art. Such gas phase reactions are typically carried out by fluidized bed, stirred or paddle-type reaction systems, and the like, as described in, for example, U.S. Pat. Nos. 4,588,790, 3,256,263, 3,625,932, British Patent Nos. 1,248,951, 1,248,952, 1,248,953, and the like. As used herein, a "polyolefin" is meant to include homopolymers, copolymers, and terpolymers of alpha-olefins and may optionally contain dienes, aromatic compounds with vinyl unsaturation and/or carbon monoxide.

Generally, the alpha-olefin monomers have from 2 to 12 carbon atoms and typically include, but are not limited to, ethylene, propylene, butene-1, pentene-1, 4-methylpentene-1, hexene-1, styrene, and the like. Preferred dienes which may optionally be polymerized with the alpha-olefins are those which are non-conjugated. These non-conjugated diene monomers may be straight chain, branched chain or cyclic hydrocarbon dienes having from about 5 to about 15 carbon atoms. Dienes which are especially preferred include 1,4-hexadiene, 5-ethylidene-2-norbornene.

Preferred aromatic compounds having vinyl unsaturation which also may be optionally polymerized with the alpha-olefins include styrene and substituted styrene.

So too, Group VIII transition metal compounds may be utilized to copolymerize carbon monoxide and alpha-olefins to form alternating co-polymer.

A catalyst is usually required to cause polymerization of the one or more alpha-olefin monomers, and the optional dienes, to take place. Such catalysts may include, but are not limited to, coordinated anionic catalysts; cationic catalysts; free-radical catalysts; anionic catalysts, and the like.

As more fully described in, for example, U.S. Pat. Nos. 3,779,712; 3,876,602; and 3,023,203, such catalysts are generally introduced into the reaction zone as solid particulates in which the catalytically active material is impregnated onto an inert support typically made of alumina or silica, and the like, to form the useable catalyst. As used herein, the term "inert" modifying a particular material, be it a catalyst support or a solvent, etc., means that the material being referred to is non-deactivating in the reaction zone under the conditions of the gas phase polymerization reaction and is non-deactivating with the catalyst in or out of the reaction zone.

Those skilled in the art have long believed that for polymerization reactions, particularly gas phase polymerization reactions, it is necessary to provide the catalyst impregnated on an inert support so as to facilitate control of polymer particle size and thereby control of the product bulk density. See, for example, U.S. Pat. No. 5,057,475. In particular, those skilled in the art believe that the size of the supported particulate catalyst is determinative of the polymer particles that are produced during the reaction, i.e., the polymer particles are about 10 to 15 times greater than the size of the supported particulate catalyst. Consequently, those skilled in the art would expect that the use of a catalyst which was unsupported would produce undesirable results. Indeed, in published European Patent Application No. 0 232 595 B1, in discussing slurry polymerization reactions utilizing a homogeneous catalyst system, i.e., an unsupported catalyst, it is taught that a disadvantage of such a catalyst system is that the polymer product produced manifests a small particle size and low bulk density. Moreover, impregnating the catalytically active material on a support is believed by those skilled in the art to desirably dilute the active centers of the catalyst. This is believed to provide greater isolation of such active centers and expose more of such sites to the monomer so as to facilitate polymerization.

One of the disadvantages associated with supported catalysts which are conventionally used in gas phase polymerization reactions, however, is that the support material, such as the alumina, silica, and the like, remains behind in the polymer product as inorganic residual ash thereby increasing the overall impurity level of the polymer depending upon the amount of such impurity, some of the properties of the polymers may possibly be affected, such as film appearance rating, impact resistance, tear strength, and the like.

So too, by being impregnated on a support, the activity of the catalyst is generally influenced by the available exposed catalyst surface area that comes into contact with the reactants. This is typically a function, among other things, of the porosity and volume of the support that is being utilized. When a support fails to provide an adequate surface area to volume ratio, then the catalyst will not exhibit high activity.

SUMMARY OF THE INVENTION

By virtue of the present invention, it has surprisingly been found that despite the admonitions of the prior art, unsupported, soluble olefin polymerization coordination catalysts are indeed useful in gas phase reactions and can be introduced into the reaction zone in liquid form without producing undesirable results. As used herein, "liquid form" includes solutions in which the catalyst or co-catalyst(s) are dissolved and, if the co-catalyst is a liquid when it is introduced into the reaction zone, then this neat form of the co-catalyst is also included in this term.

By introducing the catalyst into the reaction zone in liquid form, a number of significant advantages are realized. In particular, there are no costs associated with: (i) providing the support material per se, (ii) providing the support material in a form which is compatible for its intended use, e.g., having the necessary ratio of surface area to volume; and (iii) processing the support so as to impregnate the active catalyst thereon. Of course, by not using a support, the problem of residual ash remaining in the polymer product originating from the support is entirely eliminated.

So too, by providing the catalyst in liquid form, a very high catalyst surface area to volume ratio is realized.

Moreover, the ability to add the catalyst to the reaction zone in an unsupported, liquid form provides an easy, convenient and efficient way of catalyst introduction, avoiding solid materials handling which generally is more costly and complicated. The catalyst is simply dissolved in a suitable solvent and the resulting catalyst solution (and if necessary, a co-catalyst in liquid form) is then sprayed or injected into the reaction zone. The catalyst and co-catalyst may be premixed and introduced into the reaction zone simultaneously or, if desired, they may be introduced separately.

Surprisingly, while it might have been expected by one skilled in the catalyst/polymerization art that the introduction of a catalyst into the reaction zone in liquid form would produce poor results, or even no results at all, we have discovered that doing so provides very good results and, in some instances, provides a catalyst activity which is even greater than that found with the supported form of the catalyst. In addition to expecting small particle size and low bulk density, as discussed above, one skilled in the art would have expected that introducing the catalyst and co-catalyst in liquid form would cause undesirable swelling of the polymer or at the very least, cause aggregation and agglomeration of the polymer particles in the particle bed. Such agglomerated polymer particles would be expected by those skilled in the art to undesirably plug the gas distributor plate, plug the product discharge valve, coat the walls of the reactor and form sheets, disrupt the flow of solids and gas in the bed, and be the precursors of large chunks that may extend throughout the entire reactor. So too, it would also be expected by those skilled in the art that carryover of the liquid catalyst would occur thereby undesirably coating the walls of the heat exchanger and other downstream equipment with polymer. Moreover, one skilled in the art would also expect that the highly reactive combination of catalyst and monomer would cause polymerization right at the catalyst feeder orifice causing it to plug as well. Despite such expectations, we have now found that such problems generally do not occur and that good polymer product is obtained using the polymerization methods of the present invention.

The advantages of introducing the catalyst into the gaseous reaction zone in an unsupported form are many. In addition to reducing both cost and avoiding residual ash which have been noted earlier, the ease with which such a catalyst is prepared and introduced is also very significant. This is particularly true when more than one catalyst is to be utilized. In order to control molecular weight distribution Of the polymer, for example, it is desirable to use a mixture of catalysts such as metallocenes as discussed in, for example, U.S. Pat. No. 4,530,914. The polymerization methods of the present invention, using solutions of such catalysts instead of conventional supported forms thereof, greatly simplifies the ease of preparing and using such a multicatalyst system.

Accordingly, in one embodiment, the present invention is directed to a process for producing polymer from in a gas phase polymerization reaction which comprises:

a) continuously introducing a gaseous stream comprising one or more monomers having from 2 to 12 carbon atoms into a reaction zone;

b) introducing a polymerization catalyst in liquid form into said reaction zone; and c) withdrawing polymeric product from said reaction zone.

In an alternative embodiment, the present invention is directed to a process for producing polymer from monomer in a gas fluidized bed reactor having a reaction zone containing a bed of growing polymer particles, a lower gas diffusion zone, an upper reduced gas velocity zone, a gas inlet into said gas diffusion zone, and a gas outlet above said reduced gas velocity zone which comprises:

a) continuously passing a gaseous stream containing monomer through said gas diffusion zone and into said reaction zone with an upward velocity sufficient to maintain said particles in a suspended and gas fluidized condition;

b) introducing a catalyst in liquid form into said reaction zone;

c) withdrawing polymer product from said reaction zone;

d) continuously withdrawing a stream of unreacted gases comprising monomer from said reaction zone, compressing and cooling said stream; and e) continuously introducing said stream into said gas diffusion zone.

Generally, catalysts that are typically utilized for preparing polyolefins from alpha-olefin monomers are coordination catalysts which include the transition metal compounds selected from Groups IIIB to VIII of the Periodic Table of the Elements. From these, the transition metal olefin polymerization catalysts that are suitable for use in the present invention are those which are soluble in hydrocarbon, substantially non-coordinating solvents so that solutions of such transition metal compounds may be prepared. These hydrocarbon, substantially non-coordinating solvents are inert and do not interfere with the catalytic activity of the catalyst or with the polymerization reaction. Among the preferred transition metal compounds are those from Groups IVB, VB and VIB and most preferred are the metallocenes. Typically, transition metal olefin polymerization catalysts are utilized with a co-catalyst, such as one or more suitable organometallic compounds which are well known to those skilled in the art.

Accordingly, in a preferred embodiment of the present invention, a process for producing polymer in a gas phase polymerization reaction is disclosed which comprises:

a) continuously introducing a gaseous stream comprising one or more monomers having from 2 to 12 carbon atoms into a reaction zone;

b) introducing a polymerization catalyst into said reaction zone comprising (i) a transition metal compound selected from Groups IIIB to VIII and (ii) an organometallic compound wherein (i) and (ii) are in liquid form; and c) withdrawing polymeric product from said reaction zone.

In a more preferred embodiment, polyolefins are produced by a gas phase polymerization reaction in a reaction zone which comprises:

a) continuously introducing a gaseous stream comprising one or more alpha-olefin monomers having from two to twelve carbon atoms into said reaction zone;

b) introducing an olefin polymerization catalyst into said reaction zone comprising (i) at least one metallocene compound containing a transition metal selected from Groups IIIB to VIII and (ii) aluminoxane wherein (i) and (ii) are in liquid form; and c) withdrawing polyolefin product from said reaction zone.

In all of the various embodiments noted above, the monomers used for preparing the polymers have from two to twelve carbon atoms, preferably two to six carbon atoms.

Preferably, the polyolefins are produced utilizing a liquid catalytically active reaction product formed by reacting one or more metallocenes with one or more aluminoxanes. The metallocenes may be represented by the general formula:

$$(C_5R_x)_y R'_z(C_5R_m)MQ_{n-y-1} \quad (I)$$

wherein:

M is a metal of from Groups IIIB to VIII of the Periodic Table of the Elements;

$(C_5R_x)$ and $(C_5R_m)$ are the same or different cyclopentadienyl or substituted cyclopentadienyl groups bonded to M;

R is the same or different and is hydrogen or a hydrocarbyl radical such as alkyl, alkenyl, aryl, alkylaryl, or arylalkyl radical containing from 1 to 20 carbon atoms or two carbon atoms are joined together to form a $C_4$-$C_6$ ring;

R' is a $C_1$-$C_4$ substituted or unsubstituted alkylene radical, a dialkyl or diaryl germanium or silicon, or an alkyl or aryl phosphine or amine radical bridging two $(C_5R_x)$ and $(C_5R_m)$ rings;

Q is a hydrocarbyl radical such as aryl, alkyl, alkenyl, alkylaryl, or aryl alkyl radical having from 1–20 carbon atoms, hydrocarboxy radical having from 1–20 carbon atoms or halogen and can be the same or different from each other;

z is 0 or 1;

y is 0, 1 or 2;

z is 0 when y is 0;

n is 0, 1, 2, 3, or 4 depending upon the valence state of M;

and $n-y$ is $\geq 1$.

The aluminoxane is a poly(hydrocarbylaluminum oxide) and may be formed by reacting water with an alkylaluminum compound. The aluminoxane contains repeating units represented by the general formula:

$$\begin{array}{c} R'' \\ | \\ \bigl( Al{-}O \bigr)_{\!s} \end{array} \quad (II)$$

wherein generally R'' is an alkyl radical containing from 1 to about 12 carbon atoms or an aryl radical such as a substituted or unsubstituted phenyl or naphthyl radical.

In the preferred embodiment, the present invention is directed to a process for producing polyolefins from alpha-olefin monomer by a gas phase polymerization reaction in a reaction zone which comprises:

a) continuously introducing a gaseous stream comprising one or more alpha-olefin monomers having from 2 to 12 carbon atoms into said reaction zone;

b) introducing an olefin polymerization catalyst into said reaction zone, said polyolefin polymerization catalyst comprising a solution of at least one metallocene compound containing a transition metal selected from Groups IIIB to VIII and aluminoxane in liquid form; and c) withdrawing polyolefin product from said reaction zone.

DETAILED DESCRIPTION OF THE INVENTION

As briefly noted above, gas phase polymerization reactions may be carried out in fluidized bed reactors and stirred or paddle-type reaction systems. While the following discussion will feature fluidized bed systems, where the present invention has been found to be preferred and especially advantageous, it is to be understood that the general concepts relating to the use of the transition metal olefin polymerization catalysts in liquid form, which are discussed relevant to the preferred fluidized bed system, are also applicable to the stirred or paddle-type reaction systems as well. The present invention is not limited to any specific type of gas phase reaction system.

In very general terms, a conventional fluidized bed process for producing resins is conducted by passing a gaseous stream containing one or more monomers continuously through a fluidized bed reactor under reactive conditions and in the presence of catalyst at a velocity sufficient to maintain the bed of solid particles in a suspended condition. The gaseous stream containing unreacted gaseous monomer is withdrawn from the reactor continuously, compressed, cooled and recycled into the reactor. Product is withdrawn from the reactor and make-up monomer is added to the recycle stream.

Figure 1:
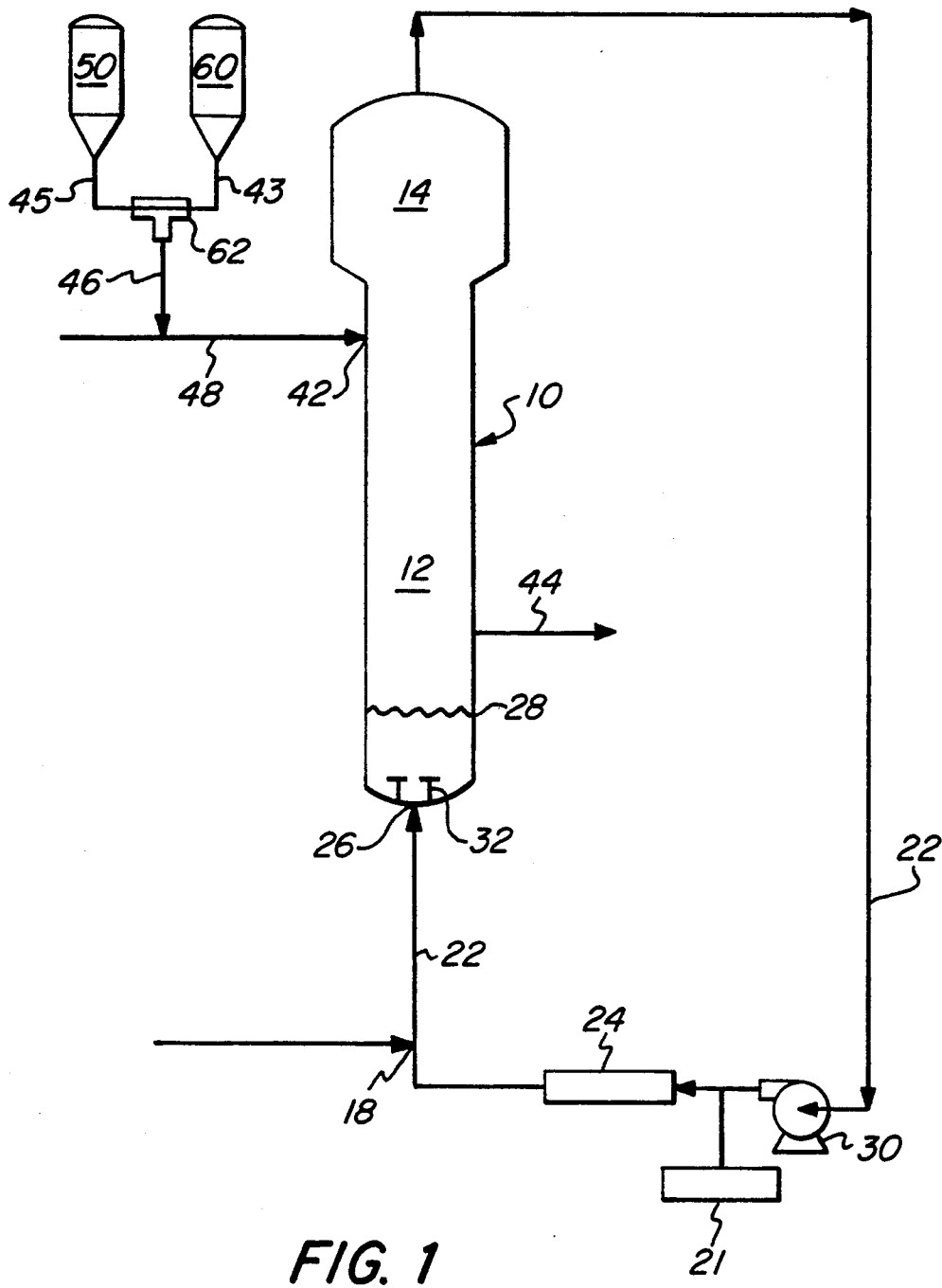
FIG. 1 is a schematic illustration of a preferred embodiment of the present invention showing a continuous, gaseous phase, fluidized bed polymerization of olefins in which the polymerization catalyst is supplied in liquid form.

A basic, conventional fluidized bed system is illustrated in FIG. 1. The reactor 10 comprises a reaction zone 12 and a velocity reduction zone 14. While a reactor configuration comprising a generally cylindrical region encompassing the fluidized bed beneath an expanded section is shown in FIG. 1, alternative configurations such as a reactor configuration comprising an entirely or partially tapered reactor may also be utilized. In such configurations, the fluidized bed is located within a tapered reaction zone but below a region of greater cross-sectional area which serves as the velocity reduction zone of the more conventional reactor configuration shown in FIG. 1.

In general, the height to diameter ratio of the reaction zone can vary in the range of about 2.7:1 to about 5:1. The range may vary to larger or smaller ratios and depends upon the desired production capacity. The cross-sectional area of the velocity reduction zone 14 is typically within the range of from about 2.5 to about 2.9 multiplied by the cross-sectional area of the reaction zone 12.

The reaction zone 12 includes a bed of growing polymer particles, formed polymer particles and a minor amount of catalyst all fluidized by the continuous flow of polymerizable and modifying gaseous components, including inerts, in the form of make-up feed and recycle fluid through the reaction zone. To maintain a viable fluidized bed, the superficial gas velocity through the bed must exceed the minimum flow required for fluidization which is typically from about 0.2 to about 0.5 ft/sec. Preferably, the superficial gas velocity is at least 0.2 ft/sec above the minimum flow for fluidization or from about 0.4 to about 0.7 ft/sec. Ordinarily, the superficial gas velocity will not exceed 5.0 ft/sec and is usually no more than about 2.5 ft/sec.

On start-up, the reactor is generally charged with a bed of particulate polymer particles before gas flow is initiated. Such particles help to prevent the formation of localized "hot spots" when catalyst feed is initiated. They may be the same as the polymer to be formed or different. When different, they are withdrawn with the desired newly formed polymer particles as the first product. Eventually, a fluidized bed consisting of desired polymer particles supplants the start-up bed.

Fluidization is achieved by a high rate of fluid recycle to and through the bed, typically on the order of about 50 times the rate of feed or make-up fluid. This high rate of recycle provides the requisite superficial gas velocity necessary to maintain the fluidized bed. The fluidized bed has the general appearance of a dense mass of individually moving particles as created by the percolation of gas through the bed. The pressure drop through the bed is equal to or slightly greater than the weight of the bed divided by the cross-sectional area.

Make-up fluids are fed at point 18 via recycle line 22. The composition of the recycle stream is typically measured by a gas analyzer 21 and the composition and amount of the make-up stream is then adjusted accordingly to maintain an essentially steady state gaseous composition within the reaction zone. The gas analyzer 21 can be positioned to receive gas from a point between the velocity reduction zone 14 and heat exchanger 24, preferably, between compressor 30 and heat exchanger 24.

To ensure complete fluidization, the recycle stream and, where desired, at least part of the make-up stream are returned through recycle line 22 to the reactor at point 26 below the bed. Preferably, there is a gas distributor plate 28 above the point of return to aid in fluidizing the bed uniformly and to support the solid particles prior to start-up or when the system is shut down. The stream passing upwardly through and out of the bed removes the heat of reaction generated by the exothermic polymerization reaction.

The portion of the gaseous stream flowing through the fluidized bed which did not react in the bed becomes the recycle stream which leaves the reaction zone 12 and passes into the velocity reduction zone 14 above the bed where a major portion of the entrained particles drop back onto the bed thereby reducing solid particle carryover.

The recycle stream is then compressed in compressor 30 and passed through heat exchanger 24 where the heat of reaction is removed from the recycle stream before it is returned to the bed. The recycle stream exiting the heat exchange zone is then returned to the reactor at its base 26 and thence to the fluidized bed through gas distributor plate 28. A fluid flow deflector 32 is preferably installed at the inlet to the reactor to prevent contained polymer particles from settling out and agglomerating into a solid mass and to maintain entrained or to re-entrain any particles or liquid which may settle out or become disentrained.

Particulate polymer product is discharged from line 44. Although not shown, it is desirable to separate any fluid from the product and to return the fluid to reactor vessel 10.

In accordance with the present invention, the polymerization catalyst enters the reactor in liquid form at a point 42 through line 48. If the catalyst requires the use of one or more co-catalysts, as is usually the case, the one or more co-catalysts may be introduced separately into the reaction zone where they will react with the catalyst to form the catalytically active reaction product. It is conventional, however, to premix the catalyst and co-catalyst(s) prior to their introduction into the reaction zone.

For example, in the catalyst system comprising metallocene as the catalyst and aluminoxane as the co-catalyst, it is the reaction product of the metallocene and the aluminoxane which forms the catalytically active material needed for polymerization of the olefins. The metallocene(s) and the aluminoxane(s) may be mixed with one another and the reacted mixture, which is still in liquid form, is introduced into the reaction zone. Alternatively, the metallocene(s) which are in liquid form and the aluminoxane(s) which are also in liquid form may be independently added to the reaction zone. It is in the reaction zone where the metallocene(s) and the aluminoxane(s) react to form the catalytically active material. As a still further embodiment, although not preferred, it is also within the scope of the present invention to react the catalyst with the co-catalyst, such as the metallocene(s) with the aluminoxane(s), and isolate a solid reaction product thereof. This catalytically active solid reaction product is then dissolved in a suitable solvent when desired and introduced into the reaction zone as a solution. It is to be understood that all of the various embodiments discussed above for introducing the polymerization catalyst into the reaction zone are broadly applicable to the more general transition metal olefin polymerization catalyst and organometallic co-catalyst as well.

In the embodiment illustrated in FIG. 1, the catalyst and co-catalyst are mixed prior to their introduction into the reaction zone. A soluble transition metal catalyst from tank 50 is fed through line 45 to a mixing tee 62 where it is mixed with one or more co-catalysts from tank 60 which is fed to mixing tee 62 through line 43. The catalyst and co-catalyst(s) are provided in liquid form. Once the mixture is in line 46, the catalyst/co-catalysts mixture react with one another to form the desired catalytic reaction product in situ. Generally, the length of line 46 is such that it provides ample residence time for the catalyst/co-catalyst(s) to react with one another and form the desired reaction product which remains in solution. In this manner, once the catalyst reaches line 48 and enters the reactor at point 42, substantially all of the catalyst/co-catalyst(s) will have reacted and catalytically reactive reaction product, which will have formed in situ, will desirably be introduced into the reaction zone in liquid form.

The solvents that are desirably utilized to form solutions of the soluble transition metal polymerization catalyst compounds are inert solvents, preferably non-functional hydrocarbon solvents and may include aliphatic hydrocarbons such as butane, isobutane, ethane, propane, pentane, isopentane, hexane, octane, decane, dodecane, hexadecane, octadecane, and the like; alicyclic hydrocarbons such as cyclopentane, methylcyclopentane, cyclohexane, cyclooctane, norbornane, ethylcyclohexane and the like; aromatic hydrocarbons such as benzene, toluene, ethylbenzene, propylbenzene, butylbenzene, xylene, and the like; and petroleum fractions such as gasoline, kerosene, light oils, and the like. Likewise, halogenated hydrocarbons such as methylene chloride, chlorobenzene, and the like, may also be utilized. By "non-functional", it is meant that the solvents do not contain groups such as strong polar groups which can deactivate the active transition metal sites.

The concentration of catalyst or co-catalyst that is provided in solution as it is being introduced into the reaction zone may be as high as the saturation point of the particular solvent being used. Preferably, the concentration is in the range of from about 0.01 to about 10,000 millimoles/liter. Of course, if the co-catalyst is being used in its neat form, i.e., in its liquid state with no solvent, it will be comprised of essentially pure co-catalyst.

It is to be understood that in the text that follows, any reference made to a "catalyst in liquid form" includes a catalyst and a co-catalyst in such liquid form and a mixture of the two.

The size of the droplets formed when introducing the catalyst into the reactor is generally determined by the manner and place in which the catalyst is introduced. It is desirable to use a means of introduction which is able to provide liquid droplets within the reactor having an average diameter which is in the range of from about 5 to about 1000 microns, preferably within the range of from about 50 to about 500 microns, so as to desirably form polymer product having a particle size within the range of from about 500 to about 5,000 microns.

The catalyst in liquid form (with or without a co-catalyst) may be introduced into the reaction zone by simply passing the catalyst in liquid form, under pressure, through a conduit extending into the reactor, which may be assisted by an inert gas (such as nitrogen) and/or an inert liquid (such as isopentane, propane, and the like) to aid in atomization so as to provide the desired liquid droplet size. The catalyst in liquid form may be introduced by conventional means such as, for example, using positive displacement pumps, pressurizing the holding tank with an inert gas, and the like. The extent of pressurization, the diameter of the conduit, the type and size of atomization nozzle (if one is used), the velocity with which the catalyst is introduced into the reactor, the superficial gas velocity of the fluids within the reactor, as well as the pressure within the reaction zone will all influence the liquid droplet size that is formed. It is well within the knowledge of those skilled in this art to vary one or more of these parameters to the extent desired while adjusting still others to obtain a desired droplet size within the reaction zone.

Preferably, the catalyst in liquid form is introduced into the reactor by means of a conventional two fluid spray nozzle in which an inert gas is used to help atomize the catalyst. The use of such a spray nozzle allows for greater control of the liquid droplet size that is produced in the reaction zone by providing enhanced atomization capability. The selection of a particular spray nozzle/tip for use with the catalyst in liquid form to provide a desired average droplet size, taking into account the reaction conditions within the reactor as well as the flow rate of the catalyst, is well within the knowledge of those skilled in the art. Generally, the orifice diameter in the spray nozzle/tip is in the range of from about 0.01 to about 0.15 inch, preferably from about 0.02 to about 0.05 inch.

The catalyst in liquid form can be introduced intermittently or continuously into the reaction zone at a desired rate at point 42, which is above distributor plate 28. Intermittent catalyst feeding may be used to help keep the catalyst solution flow rate in the proper range for optimum nozzle performance while independently maintaining the desired average catalyst feed rate. It is desirable to maintain a continuous flow of the inert carrier through the nozzle, be it a liquid or gas, at a rate sufficient to prevent fouling of the injection nozzle. Conventional metering valves or pumps can be used to deliver a precise flow of the catalyst to the reaction zone. Controlled intermittent catalyst flow may be delivered to the reaction zone using conventional syringe or positive displacement pumps.

Injection of the catalyst in liquid form into the reactor is preferably carried out in the upper portion of the fluidized bed to provide uniform distribution and to minimize catalyst carryover into the recycle line where polymerization may begin and plugging of the recycle line and heat exchanger may eventually occur. Carryover of catalyst into the recycle line can result in polymerization occurring outside the reactor reaction zone which can cause plugging of the recycle line and fouling in the heat exchanger. However, if desired, the catalyst in liquid form may be introduced into the reaction zone entirely above the fluidized bed at a point in the reactor which is still low enough so as to minimize any catalyst carryover into the recycle line taking into account the cross-sectional area of the reactor at the point of catalyst injection, the velocity of the gaseous stream passing through the fluidized bed, the entry point into the reactor for the catalyst and the droplet size of the catalyst.

The rate of polymer production in the bed depends on the rate of catalyst injection, the activity of the catalyst, and the concentration of monomer(s) in the recycle stream at the particular reaction conditions. Generally, from about 100,000 to about 1,000,000 pounds of polyolefins are produced for every pound of transition metal contained within the catalyst that is introduced into the reaction zone. The production rate is conveniently controlled by simply adjusting the rate of catalyst introduction.

Under a given set of operating conditions, the fluidized bed is maintained at essentially a constant height by withdrawing a portion of the bed as product at a rate essentially equivalent to the rate of formation of the particulate polymer product.

The fluid bed reactor is operated at a temperature below the sintering temperature of the polymer particles to ensure that sintering will not occur. The sintering temperature is a function of resin density. Accordingly, temperatures of from about 75° C. to about 95° C. may be used to prepare ethylene copolymers having a density of from about 0.91 g/cm$^3$ to about 0.95 g/cm$^3$, while temperatures of from about 90° C. to about 115° C. may be used to prepare ethylene copolymers or homopolymers having a density of from about 0.95 g/cm$^3$ to about 0.97 g/cm$^3$.

The temperature of the catalyst in liquid form as it is introduced into the reaction zone is not critical. Typically, the temperature of the catalyst in liquid form may simply be at ambient temperature.

The fluid bed reactor is typically operated at pressures of up to about 1,000 psig. For polyolefin resin production, the reactor is preferably operated at a pressure of from about 250 to about 500 psig, with operation at the higher pressures in such ranges being favorable since higher heat transfer is experienced due to an increase in the unit volume heat capacity of the gas as the pressure is increased.

The catalyst precursor compounds that can be used in the present invention include transition metal compounds from Groups IIIB-VIII of the Periodic Table that are soluble in hydrocarbon solvents. Among the preferred transition metal compounds are compounds from Groups IVB-VIB. Compounds based on magnesium/titanium electron-donor complexes that are useful are described in, for example, U.S. Pat. Nos. 4,302,565 and 4,302,566. The MgTiCl$_6$ (ethyl acetate)$_4$ derivative is particularly preferred. British Patent Application 2,105,355 describes a range of hydrocarbon soluble vanadium compounds which are also suitable.

The vanadium compounds which can be used in liquid form to practice the polymerization processes of the present invention are hydrocarbon-soluble vanadium salts. Of course, mixtures of these vanadium compounds may also be used. Non-limiting, illustrative examples of these compounds are as follows:

A. vanadyl trihalide, alkoxy halides and alkoxides such as VOCl$_3$, VOCl$_2$(OBu) where Bu = butyl and VO(OC$_2$H$_5$)$_3$.

B. vanadium tetrahalide and vanadium alkoxy halides such as VCl$_4$ and VCl$_3$(OBu).

C. vanadium and vanadyl acetyl acetonates and chloroacetyl acetonates such as V(AcAc)$_3$ and VOCl$_2$(AcAc) where (AcAc) is an acetyl acetonate.

The preferred vanadium compounds are VOCl$_3$, VCl$_4$ and VOCl$_2$-OR where R is a hydrocarbon radical, preferably a C$_1$ to C$_{10}$ aliphatic or aromatic hydrocarbon radical such as ethyl, phenyl, isopropyl, butyl, propyl, n-butyl, i-butyl, t-butyl, hexyl, cyclohexyl, naphthyl, etc., and vanadium acetylacetonates.

Hydrocarbon soluble chromium compounds which are suitable for use in liquid form in the present invention include chromyl chloride (CrO$_2$Cl$_2$), chromium 2-ethylhexanoate, chromium acetylacetonate (Cr(AcAc)$_3$), and the like, which are disclosed in, for example, U.S. Pat. Nos. 3,242,099 and 3,231,550.

Still other transition metal polymerization catalysts which are suitable for use in the present invention are disclosed in U.S. Pat. Nos. 4,124,532, 4,302,565 and 4,302,566 and published European Patent Application Nos. 0 416 815 A2 and 0 420 436 A1. Such additional compounds have the general formula:

$$M'_tM''X_{2t}Y.uE \qquad (III)$$

where

M' = Mg, Mn and/or Ca;
t = a number from 0.5 to 2;
M'' = Ti, V and/or Zr;
X = Cl, Br or I;
Y = may be the same or different and is halogen, alone or in combination with oxygen, —NR$_2$, —OR, —SR,

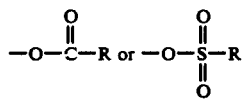

(in which R is a hydrocarbon radical, in particular an alkyl, aryl, cycloalkyl or aralkyl radical), acetylacetonate anion; acetylacetonate anion, being present in such an amount as to satisfy the valence of M';

u = a number from 0.5m to 20m;
E = an electron-donor compound selected from the following classes of compounds:
(a) esters of organic carboxylic acids;
(b) alcohols;
(c) ethers;
(d) amines;
(e) esters of carbonic acid;
(f) nitriles;
(g) phosphoramides,
(h) esters of phosphoric and phosphorous acid, and
(j) phosphorus oxychloride Complexes within the above general formula include:

MgTiCl$_5$.2CH$_3$COOC$_2$H$_5$
Mg$_3$Ti$_2$Cl$_{12}$.7CH$_3$COOC$_2$H$_5$
MgTiCl$_5$.6C$_2$H$_5$OH
MgTiCl$_5$.100CH$_3$OH
MgTiCl$_5$.tetrahydrofuran
MgTi$_2$Cl$_{12}$.7C$_6$H$_5$CN
Mg$_3$Ti$_2$Cl$_{12}$.6C$_6$H$_5$COOC$_2$H$_5$
MgTiCl$_6$.2CH$_3$COOC$_2$H$_5$

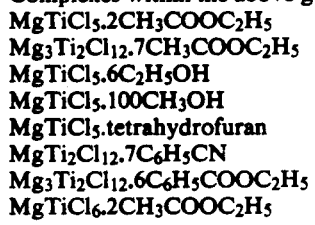

MgtiCl$_6$.6C$_5$H$_5$N
MgTiCl$_5$(OCH$_3$).2CH$_3$COOC$_2$H$_5$
MgTiCl$_5$N(C$_6$H$_5$)$_2$.3CH$_3$COOC$_2$H$_5$
MgTiBr$_2$Cl$_4$.2(C$_2$H$_5$)$_2$O
MnTiCl$_5$.4C$_2$H$_5$OH
Mg$_3$V$_2$Cl$_{12}$.7CH$_3$COOC$_2$H$_5$
MgZrCl$_6$.4 tetrahydrofuran Another type of transition metal olefin polymerization catalyst precursors which in liquid form can be used in accordance with the invention are metal coordination complexes corresponding to the formula:

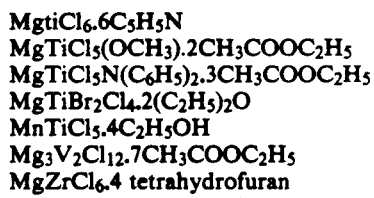

wherein:
M is a metal of Group IIIB to VIII of the Periodic Table of the Elements:
Cp is a cyclopentadienyl or substituted cyclopentadienyl group bound in an $\eta^5$ bonded mode to M;
Z is a moiety comprising boron, or a member of Group IVB of the Periodic Table of the Elements and optionally sulfur or oxygen, said moiety having up to 20 non-hydrogen atoms, and optionally Cp and Z together form a fused ring system;
X' is an anionic ligand group or a neutral Lewis base ligand group having up to 30 non-hydrogen atoms;
a is 0, 1, 2, 3 or 4 depending on the valance of M; and
Y' is an anionic or non-anionic ligand group bonded to Z and M and is nitrogen, phosphorus, oxygen or sulfur having up to 20 non-hydrogen atoms, and optionally Y and Z together form a fused ring system.

Such metal coordination complexes are well known to those skilled in the art and are disclosed in, for example, U.S. Pat. Nos. 5,026,798 and 5,055,438 and published European Application No. 0 416 815 A2.

Illustrative but non-limiting examples of the compounds represented by the above formula are:

| Z | Cp | Y | X | M |
|---|---|---|---|---|
| dimethylsilyl | cyclopentadienyl | t-butylamido | chloride | titanium |
| methylphenyl- | fluorenyl | phenylamido | methyl | zirconium |

-continued

| Z | Cp | Y | X | M |
|---|---|---|---|---|
| silyl | | | | |
| diphenylsilyl | indenyl | cyclohexyl-amido | | hafnium |
| tetramethyl-ethylene | | oxo | | |
| ethylene | tetramethyl-cyclopenta-dienyl | | | |
| diphenyl-methylene | | | | |

Typical organometallic co-catalysts other than the aluminoxanes that are suitable in liquid form for the purposes of the present invention are any of the compounds of the general formula:

$$M^3M^4_vX^2_cR^3_{b-c} \quad \text{(V)}$$

herein $M^3$ is a metal of Groups IA, IIA and IIIA of the periodic table; $M^4$ is a metal of Group IA of the Periodic table; v is a number from 0 to 1; each $X^2$ is any halogen; c is a number from 0 to 3; each $R^3$ is a monovalent hydrocarbon radical or hydrogen; b is a number from 1 to 4; and wherein b-c is at least 1.

Compounds having only one Group IA, IIA or IIIA metal which are suitable for the practice of the invention include compounds having the formula:

$$M^3R^3_k \quad \text{(VI)}$$

wherein:
$M^3$ is a Group IA, IIA or IIIA metal, such as lithium, sodium, beryllium, barium, boron, aluminum, zinc, cadmium, and gallium;
k equals 1, 2 or 3 depending upon the valency of $M^3$ which valency in turn normally depends upon the particular group (i.e., IA, IIA or IIIA) to which $M^3$ belongs; and
each $R^3$ may be any monovalent hydrocarbon radical. Examples of suitable $R^3$ groups include any of the $R^3$ groups aforementioned in connection with formula (V).

Entirely suitable for the purposes of the present invention are the organometallic compounds of Groups IA, IIA, and IIIA, such as methyl and butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as trihexylaluminum, triethylaluminum, trimethylaluminum, and triisobutylaluminum.

In addition, mono-organohalides and hydrides of Group IIA metals, and mono- or di-organohalides and hydrides of Group IIIA metals conforming to the general formula (VI) are also suitable. Specific examples of such compounds are diisobutylaluminum bromide, isobutylboron dichloride, methyl magnesium chloride, ethylberyllium chloride, ethylcalcium bromide, diisobutylaluminum hydride, methylcadmium hydride, diethylboron hydride, hexylberyllium hydride, dipropylboron hydride, octylmagnesium hydride, butylzinc hydride, dichloroboron hydride, dibromoaluminum hydride and bromocadmium hydride. Such organometallic co-catalyst compounds are well known to those skilled in the art and a more complete discussion of these compounds may be found in U.S. Pat. Nos. 3,221,002 and 5,093,415.

In a preferred embodiment of the present invention, the polyolefins are produced utilizing the catalytically active reaction product of one or more metallocenes with aluminoxane, which is introduced into the gas phase fluidized bed reactor in liquid form.

The metallocenes are organometallic compounds which are cyclopentadienyl derivatives of a Group IVB, VB, VIB or VIII metal of the Periodic Table and include mono, di and tricyclopentadienyls and their derivatives of the transition metals. Particularly desirable are metallocene complexes of a Group IVB and VB metal such as titanium, zirconium, hafnium and vanadium.

The aluminoxanes are well known in the art and comprise oligomeric linear and/or cyclic alkyl aluminoxanes represented by the formula:

$$R''-(Al-O)_s-AlR''_2 \quad \text{(VII)}$$
$$\phantom{R''-(Al}|\phantom{-O)_s-AlR''_2}$$
$$\phantom{R''-(Al}R''$$

for oligomeric, linear aluminoxanes; and $$+Al-O+_p \quad \text{(VIII)}$$
$$\phantom{+A}|$$
$$\phantom{+A}R''$$

for oligomeric, cyclic aluminoxane; wherein s is 1–40, preferably 10–20, p is 3–40, preferably 3–20 and $R''$ is a $C_1$–$C_{12}$ alkyl group, preferably methyl and an aryl radical such as a substituted or unsubstituted phenyl or naphthyl radical.

Generally, in the preparation of aluminoxanes from, for example, aluminum trimethyl and water, a mixture of linear and cyclic compounds is obtained.

The aluminoxanes may be prepared in a variety of ways. For example, the aluminum alkyl may be treated with water in the form of a moist solvent. Alternatively, the aluminum alkyl, such as aluminum trimethyl may be contacted with a hydrated salt such as hydrated ferrous sulfate. This latter method comprises treating a dilute solution of aluminum trimethyl in, for example, toluene with a suspension of ferrous sulfate heptahydrate. It is also possible to form methylaluminoxanes by the reaction of a tetraalkyldialuminoxane containing $C_2$ or higher alkyl groups with trimethylaluminum using an amount of trimethylaluminum which is less than a stoichiometric excess. The synthesis of methylaluminoxanes may also be achieved by the reaction of a trialkylaluminum compound or a tetraalkyldialuminoxane containing $C_2$ or higher alkyl groups with water to form a polyalkyl aluminoxane which is then reacted with trimethylaluminum. Further, methylaluminoxanes, which are also known as modified aluminoxanes, may be synthesized by the reaction of a polyalkyl aluminoxane containing $C_2$ or higher alkyl groups with trimethylaluminum and then with water as disclosed in, for example, U.S. Pat. No. 5,041,584.

The preferred metallocenes may be represented by the general formula:

$$(C_5R_x)_yR'_z(C_5R_m)MQ_{n-y-1} \quad \text{(I)}$$

wherein:
M is a metal of Groups IIIB to VIII of the Periodic Table of the Elements;

($C_5R_x$) and ($C_5R_m$) are the same or different cyclopentadienyl or substituted cyclopentadienyl groups bonded to M;

R is the same or different and is hydrogen or a hydrocarbyl radical such as alkyl, alkenyl, aryl, alkylaryl, or arylalkyl radical containing from 1 to 20 carbon atoms or two carbon atoms are joined together to form a $C_4$-$C_6$ ring;

R' is a $C_1$-$C_4$ substituted or unsubstituted alkylene radical, a dialkyl or diaryl germanium or silicon, or an alkyl or aryl phosphine or amine radical bridging two ($C_5R_x$) and ($C_5R_m$) rings;

Q is a hydrocarbyl radical such as aryl, alkyl, alkenyl, alkylaryl, or aryl alkyl radical having from 1–20 carbon atoms, hydrocarboxy radical having from 1–20 carbon atoms or halogen and can be the same or different from each other;

z is 0 or 1;

y is 0, 1 or 2;

z is 0 when y is 0;

n is 0, 1, 2, 3, or 4 depending upon the valence state of M;

and $n-y$ is $\geq 1$.

Illustrative but non-limiting examples of the metallocenes represented by the above formula are dialkyl metallocenes such as bis(cyclopentadienyl)titanium dimethyl, bis(cyclopentadienyl)titanium diphenyl, bis(cyclopentadienyl)zirconium dimethyl, bis(cyclopentadienyl)zirconium diphenyl, bis(cyclopentadienyl)hafnium dimethyl and diphenyl, bis(cyclopentadienyl)titanium di-neopentyl, bis(cyclopentadienyl)zirconium di-neopentyl, bis(cyclopentadienyl)titanium dibenzyl, bis(cyclopentadienyl)zirconium dibenzyl, bis(cyclopentadienyl)vanadium dimethyl; the mono alkyl metallocenes such as bis(cyclopentadienyl)titanium methyl chloride, bis(cyclopentadienyl)titanium ethyl chloride, bis(cyclopentadienyl)titanium phenyl chloride, bis(cyclopentadienyl)zirconium methyl chloride, bis(cyclopentadienyl)zirconium ethyl chloride, bis(cyclopentadienyl)zirconium phenyl chloride, bis(cyclopentadienyl)titanium methyl bromide; the trialkyl metallocenes such as cyclopentadienyl titanium trimethyl, cyclopentadienyl zirconium triphenyl, and cyclopentadienyl zirconium trineopentyl, cyclopentadienyl zirconium trimethyl, cyclopentadienyl hafnium triphenyl, cyclopentadienyl hafnium trineopentyl, and cyclopentadienyl hafnium trimethyl; monocyclopentadienyls titanocenes such as, pentamethylcyclopentadienyl titanium trichloride, pentaethylcyclopentadienyl titanium trichloride; bis(pentamethylcyclopentadienyl) titanium diphenyl, the carbene represented by the formula bis(cyclopentadienyl)titanium=$CH_2$ and derivatives of this reagent; substituted bis(cyclopentadienyl)titanium (IV) compounds such as: bis(indenyl)titanium diphenyl or dichloride, bis(methylcyclopentadienyl)titanium diphenyl or dihalides; dialkyl, trialkyl, tetra-alkyl and penta-alkyl cyclopentadienyl titanium compounds such as bis(1,2-dimethylcyclopentadienyl)titanium diphenyl or dichloride, bis(1,2-diethylcyclopentadienyl)titanium diphenyl or dichloride; silicon, phosphine, amine or carbon bridged cyclopentadiene complexes, such as dimethyl silyldicyclopentadienyl titanium diphenyl or dichloride, methyl phosphine dicyclopentadienyl titanium diphenyl or dichloride, methylenedicyclopentadienyl titanium diphenyl or dichloride and other dihalide complexes, and the like; as well as bridged metallocene compounds such as isopropyl(cyclopentadienyl)(fluorenyl)zirconium dichloride, isopropyl(cyclopentadienyl) (octahydrofluorenyl)zirconium dichloride diphenylmethylene(cyclopentadienyl)(fluorenyl) zirconium dichloride, diisopropylmethylene (cyclopentadienyl)(fluorenyl)zirconium dichloride, diisobutylmethylene(cyclopentadienyl)(fluorenyl) zirconium dichloride, ditertbutylmethylene (cyclopentadienyl)(fluorenyl)zirconium dichloride, cyclohexylidene(cyclopentadienyl)(fluorenyl) zirconium dichloride, diisopropylmethylene (2,5-dimethylcyclopentadienyl)(fluorenyl)zirconium dichloride, isopropyl(cyclopentadienyl)(fluorenyl) hafnium dichloride, diphenylmethylene (cyclopentadienyl) (fluorenyl)hafnium dichloride, diisopropylmethylene(cyclopentadienyl) (fluorenyl)hafnium dichloride, diisobutylmethylene(cyclopentadienyl) (fluorenyl)hafnium dichloride, ditertbutylmethylene(cyclopentadienyl) (fluorenyl)hafnium dichloride, cyclohexylidene(cyclopentadienyl)(fluorenyl)hafnium dichloride, diisopropylmethylene(2,5-dimethylcyclopentadienyl) (fluorenyl)hafnium dichloride, isopropyl(cyclopentadienyl)(fluorenyl)titanium dichloride, diphenylmethylene(cyclopentadienyl) (fluorenyl)titanium dichloride, diisopropylmethylene(cyclopentadienyl) (fluorenyl)titanium dichloride, diisobutylmethylene(cyclopentadienyl) (fluorenyl)titanium dichloride, ditertbutylmethylene(cyclopentadienyl) (fluorenyl)titanium dichloride, cyclohexylidene(cyclopentadienyl) (fluorenyl)titanium dichloride, diisopropylmethylene(2,5 dimethylcyclopentadienyl fluorenyl)titanium dichloride, racemic-ethylene bis (1-indenyl) zirconium (IV) dichloride, racemic-ethylene bis (4,5,6,7-tetrahydro-1-indenyl) zirconium (IV) dichloride, racemic-dimethylsilyl bis (1-indenyl) zirconium (IV) dichloride, racemic-dimethylsilyl bis (4,5,6,7-tetrahydro-1-indenyl) zirconium (IV) dichloride, racemic-1,1,2,2- tetramethylsilanylene bis (1-indenyl) zirconium (IV) dichloride, racemic-1,1,2,2-tetramethylsilanylene bis (4,5,6,7-tetrahydro-1- indenyl) zirconium (IV), dichloride, ethylidene (1-indenyl tetramethylcyclopentadienyl) zirconium (IV) dichloride, racemic- dimethylsilyl bis (2-methyl-4-t-butyl-1-cyclopentadienyl) zirconium (IV) dichloride, racemic-ethylene bis (1-indenYl) hafnium (IV) dichloride, racemic-ethylene bis (4,5,6,7-tetrahydro-1-indenyl) hafnium (IV) dichloride, racemic-dimethylsilyl bis (1-indenyl) hafnium (IV) dichloride, racemic-dimethylsilyl bis (4,5,6,7-tetrahydro-1- indenyl) hafnium (IV) dichloride, racemic-1,1,2,2- tetramethylsilanylene bis (1-indenyl) hafnium (IV) dichloride, racemic-1,1,2,2-tetramethylsilanylene bis (4,5,6,7-tetrahydro-1- indenyl) hafnium (IV), dichloride, ethylidene (1-indenyl-2,3,4,5-tetramethyl-1-cyclopentadienyl) hafnium (IV) dichloride, racemic- ethylene bis (1-indenyl) titanium (IV) dichloride, racemic-ethylene bis (4,5,6,7-tetrahydro-1-indenyl) titanium (IV) dichloride, racemic- dimethylsilyl bis (1-indenyl) titanium (IV) dichloride, racemic- dimethylsilyl bis (4,5,6,7-tetrahydro-1-indenyl) titanium (IV) dichloride, racemic-1,1,2,2-tetramethylsilanylene bis (1-indenyl) titanium (IV) dichloride racemic-1,1,2,2-tetramethylsilanylene bis (4,5,6,7-tetrahydro-1-indenyl) titanium (IV) dichloride, and ethylidene (1-indenyl-2,3,4,5-tetramethyl-1-cyclopentadienyl) titanium IV) dichloride.

The reaction products of the metallocene and aluminoxane which are generally solid materials when produced in aliphatic solvents and oils when produced in aromatic solvents can be recovered by any well known technique. For example, the solid material can be recovered from the liquid by vacuum filtration or decantation. The oils can be recovered by decantation, and when dried, become glassy solids. The recovered material is thereafter dried under a stream of pure dry nitrogen, dried under vacuum, or by any other convenient manner. The recovered solid is the catalytically active material.

This catalytically active material, in accordance with the present invention, may be dissolved in a suitable solvent so as to be provided as a solution to the reaction zone. Of course, as was noted above, the catalytically active material, which is the reaction product of the metallocene and the aluminoxane, is most preferably and conveniently formed in situ by mixing the metallocene catalyst and the aluminoxane co-catalyst just prior to introducing the mixture into the reactor while providing enough residence time for the reaction to occur so as to form the catalytically active material. Although this embodiment is more desirable than first forming and separating the solid reaction product and then forming a solution thereof which is introduced into the reaction zone, this latter embodiment is still within the scope of the present invention.

The amount of aluminoxane and metallocene usefully employed in preparation of the catalytically active material, whether the active material is formed in situ as it is being introduced into the gas phase reactor or formed well in advance and introduced as such while in liquid form, can vary over a wide range. The mole ratio of aluminum atoms contained in the aluminoxane to metal atoms contained in the metallocene is generally in the range of from about 2:1 to about 100,000:1, preferably in the range of from about 10:1 to about 10,000:1, and more preferably in the range of from about 50:1 to about 2,000:1.

A metallocene is typically converted to an active catalyst with an ionizing agent such as the aluminoxanes discussed above. Such an ionizing agent reacts with the neutral metallocene to form a cationic metallocene which operates as the active catalyst. The ionizing agent can be a co-catalyst compound such as the aluminoxane or it may be an ionizing ionic compound that forms an anion which is chemically unreactive with the cationic metallocene. The anion is not coordinated or is loosely coordinated with the cationic metallocene. The use of such ionizing agents containing unreactive anions are disclosed in, for example, European Patent Application Publication Nos. 0 426 637, 0 426 638, and 0 427 697. Methods for generating cationic metallocenes are also disclosed in the following publications: European Patent Application Publication Nos. 0 277 003 and 0 277 004; "Ethylene Polymerization by a Cationic Dicyclopentadienylzirconium(IV) Alkyl Complex," R.F. Jordan, C.S. Bajgur, R. Willett, B. Scott, J. Am. Chem. Soc., p. 7410–7411, Vol 108 (1986); "Synthesis and Insertion Reactions of Cationic Alkylbis(cyclopentadienyl)titanium Complexes," M. Bochmann, L. M. Wilson, J. Chem. Soc. Commun., p. 1610–1611 (1986); "Insertion Reactions of Nitriles in Cationic Alkylbis(cyclopentadienyl)titanium Complexes, M. Bochmann, L. Wilson, Organometallics, p. 1147–1154, Vol 7 (1987); and "Multiple Metal-Carbon Bonds," R.R. Schrock, P.P. Sharp, J. Am. Chem. Soc. p. 2389–2399, Vol 100 (1978).

The ionizing ionic agent is typically mixed with an equimolar quantity of the neutral derivative of the metallocene producing the following reaction:

$$(C_5R_x)_yR'_z(C_5R_m)MR''_2 + [C][A] \rightarrow [(C_5R_x)_yR'_z(C_5R_m)MR''] + [A]^- + R''[C]$$

wherein:
[C] is a carbonium, oxonium, or sulfonium cation
[A] is an anion is not coordinated or is only loosely coordinated with the cationic metallocene and is chemically unreactive with the cationic metallocene
R and R" are the same or different and is hydrogen or a hydrocarbyl radical such as alkyl, alkenyl, aryl, alkylaryl, or arylalkyl radical containing from 1 to 20 carbon atoms or two carbon atoms joined together to form a $C_4$-$C_6$ ring;
M is a metal of from Groups IIIB to VIII of the Periodic Table of the Elements;
$(C_5R_x)$ and $(C_5R_m)$ are the same or different cyclopentadienyl or substituted cyclopentadienyl groups bonded to M;
R' is a $C_1$-$C_4$ substituted or unsubstituted alkylene radical, a dialkyl or diaryl germanium or silicon, or an alkyl or aryl phosphine or amine radical bridging two $(C_5R_x)$ and $(C_5R_m)$ rings;
z is 0 or 1;
y is 0, 1 or 2;
z is 0 when y is 0;
Ionizing ionic compounds containing a carbonium, oxonium, or sulfonium cation are applicable. Triphenylmethyltetrakis(pentafluorophenyl) borate is preferred.

A catalyst system that does not require an aluminoxane includes metallocene complexes with one or more dinegative ligands substituted for the uninegative cyclopentadienyl ligands. The use of such compounds is disclosed in commonly assigned U.S. patent application Ser. No. 814,809, filed Dec. 31, 1991 now U.S. Pat. No. 5,214,173 and U.S. patent application Ser. No. 814,810, filed Dec. 31, 1991 now U.S. Pat. No. 5,162,466. Examples of such polyolefin catalysts include:
$[C_5(CH_3)_5][C_2B_9H_{11}]ZrCH_3$ and $[[C_5(CH_3)_5][C_2B_9H_{11}]Zr]_2\text{-}\mu\text{-}CH_2$.

As discussed, the present invention is particularly advantageous when utilizing two or more metallocene compounds. U.S. Pat. No. 4,530,914 discloses the use of mixtures of at least two different metallocene compounds to control the molecular weight distribution. Mono or biscyclopentadienyl transition metal compound catalysts being homogeneous, produce polyolefins with narrow molecular weight distribution and narrow compositional distribution. Changes in the ligand substituents or metal component of the mono or biscyclopentadienyl transition metal compound are known to affect polymerization propagation and termination rate constants which in turn affect molecular weight and comonomer distribution of the resulting polyolefin product. The proper choice of a mixture of different mono or biscyclopentadienyl transition metal compound permits the control of molecular weight distribution and compositional distribution directly in the polymerization process without requiring energy intensive blending techniques following the polymerization.

The polyolefins formed by the methods of the present invention may optionally contain dienes. Examples of suitable non-conjugated dienes are straight chain acyclic dienes such as 1,4-hexadiene, 1,5-hexadiene, 1,7-octadiene, 1,9-decadiene and 1,6-octadiene; branched chain acyclic dienes such as 5-methyl-1,4-hexadiene, 3,7-dimethyl-1,6-octadiene, 3,7-dimethyl-1,7-octadiene and mixed isomers of dihydromyricene and dihydrocinene; single ring alicyclic dienes such as 1,3-cyclopentadiene, 1,4-cyclohexadiene, 1,5- cyclooctadiene and 1,5-cyclododecadiene; and multi-ring alicyclic fused and bridged ring dienes such as tetrahydroindene, methyl tetrahydroindene, dicyclopentadiene, bicyclo-(2,2,1)-hepta-2,5-diene, alkenyl, alkylidene, cycloalkenyl and cycloalkylidene norbornenes such as 5-methylene-2-norbornene, 5-propenyl-2-norbornene, 5-isopropylidene-2-norbornene, 5-(4-cyclopentenyl)-2-norbornene, 5-cyclohexylidene-2-norbornene, 5-vinyl-2-norbornene and norbornadiene.

Conventional catalyst additives may be introduced into the reaction zone as part of the catalyst solution provided that they do not interfere with the desired atomization of the catalyst solution. In order for such additives to be added to the reaction zone as part of the catalyst solution, they must be liquids or capable of being dissolved in the catalyst solution. If the additives are solids, they can be introduced into the reaction zone independently of the catalyst solution.

Such additives may include promoters, chain transfer agents, scavenging agents, and the like. Typical promoters include halogenated hydrocarbons such as $CHCl_3$, $CFCl_3$, $CH_3CCl_3$, $CF_2ClCCl_3$, and ethyltrichloroacetate. Such promoters are well known to those skilled in the art and are disclosed in, for example, U.S. Pat. No. 4,988,783. Chain transfer agents may be used to control polymer molecular weight. Examples of these compounds are hydrogen and metal alkyls of the general formula $$M^3R^5{}_g \qquad (IX)$$

where $M^3$ is a Groups IA, IIA, or IIIA metal, $R^5$ is an alkyl or aryl, and g is 1, 2, or 3. $M^3R^5$ is preferably a zinc alkyl and is most preferably diethylzinc. Other organometallic compounds such as scavenging agents for poisons may also be employed to increase the catalyst activity. Examples of these compounds are also metal alkyls having the same general formula (V) as noted above and preferably are an aluminum alkyls, most preferably triisobutyl-aluminum. The use of these additives and the manner of doing so is well within the skill of those skilled in the art.

The polymers that are produced in accordance with the present invention using the catalysts in liquid form have excellent properties and are at least equal to, if not better, than those obtainable with conventional, supported catalysts. These polymers have a narrow molecular weight distribution as measured by gel permeation chromatography with $M_w/M_n$ values ranging from 2 to 4 and melt flow ratios of from 20 to 40. The molecular weight can be varied to obtain melt indices from approximately 0.1 to 1000 dg/min. Polymers with densities ranging from 0.86 to 0.97 g/ml can be prepared by varying the amount of comonomer(s) used in the polymerization. The n-hexane extractables values obtained for the catalysts of the present invention are typically lower than the values that would be expected for conventional supported catalysts. The film appearance ratings and mechanical properties of the polymers are at most equal to those of the conventional catalysts. The melt temperatures and head pressures required for processing of the polymers are also at most equal to the conventional supported catalysts. The stereoregularities of polypropylenes prepared using the catalysts in the liquid form are comparable to those of the supported catalysts. Syndiotacticties as measured by $^{13}$CNMR with greater than 0.85 rrrr pentad fractions and isotacticites with greater than 0.85 mmmm pentad fractions are obtained. Catalyst activities are also at least equal to the conventional supported catalysts.

EXAMPLES

I. NOMENCLATURE

The following terms and chemical abbreviations are used in the examples:

MAO—solution of methyl aluminoxane in toluene, approximately 1.8 molar in aluminum, obtained from Ethyl Corporation (Baton Rouge, La.)

MMAO in isopentane—solution of modified methyl aluminoxane containing isobutyl groups in isopentane, approximately 2.3 molar in aluminum, obtained from Akzo Chemicals Inc. as "MMAO-3A" (Chicago, Ill.)

MMAO in heptane—solution of modified methyl aluminoxane containing isobutyl groups in heptane, approximately 2.3 molar in aluminum, obtained from Akzo Chemicals Inc. as "MMAO-3A" (Chicago, Ill.)

iPrCp(Flu)ZrCl$_2$—isopropyl (cyclopentadienyl-9-fluorenyl) zirconium dichloride Me$_2$C(Cp)(Flu)ZrCl$_2$ DPZ—diphenylmethylene(cyclopentadienyl-9-fluorenyl) zirconium dichloride and lithium chloride $\phi_2$C(Cp)(Flu)ZrCl$_2$/2LiCl Me$_2$Si(Ind)$_2$ZrCl$_2$—dimethylsilyl(bis-indenyl) zirconium dichloride (MeCp)$_2$ZrCl$_2$—1,1'-bis-methylcyclopentadienyl zirconium dichloride obtained from Schering Berlin Polymers Inc. (Dublin, Ohio) (CH$_3$C$_5$H$_4$)$_2$ZrCl$_2$ Cp—C$_5$H$_5$ cyclopentadienyl ligand Flu—Cl$_3$H$_8$ fluorenyl ligand Ind—C$_9$H$_7$ indenyl ligand sPP—syndiotactic polypropylene LLDPE—linear low density polyethylene EPDM—ethylene propylene ethylidene norbornene terpolymer EBDM—ethylene butene ethylidene norbornene terpolymer THF—tetrahydrofuran TIBA—triisobutyl aluminum ENB—5-ethylidene-2-norbornene "Std tube" means that the mixed catalyst/cocatalyst solutions were introduced into the reactor with nitrogen from a ⅛" Swagelok Tee through a ¼" injection tube using a conventional positive displacement pumps and a continuous nitrogen source. The transition metal catalyst positive displacement pump delivers sharp shots of 0.1 ml once every 4-12 seconds depending on the desired catalyst feed rate. The MMAO positive displacement pump delivers a half-sine pulse form of injection for a period of about 3 seconds/pulse.

"Nozzle" means the use of a pneumatic nozzle with the conventional positive displacement pumps and continuous nitrogen source.

"Pulse" means that in addition to the sharp pulses from the catalyst pump, the MMAO was pumped in sharp shots (rather than the slow half-sine flow) coincident with the catalyst pump shots. In addition, a burst of about 3.5 lb/hr of nitrogen was fed into the injector coincident with the pump strokes. This pulse feed technique was used with both the nozzle and the tube injectors.

II. TEST METHODS AND TERMS $C_3$ (wt %)—propylene content determined by $^1$HNMR ENB (wt %)—5-ethylidene-2-norbornene content determined by $^1$HNMR MF—melt flow—ASTM D-1238, Condition L measured at 230° C. with a 2160 g load, reported as grams per 10 minutes MI—melt index—ASTM D-1238, Condition E measured at 190° C., reported as grams per 10 minutes FI—flow index—ASTM D-1238, Condition F measured at 190° C. with a 21.6 kg load MFR—melt flow ratio—FI/MI ICP—inductively coupled plasma analysis of metal residue APS—average particle size Density—a plaque is made and conditioned for one hour at 100° C. to approach equilibrium crystallinity, measurement for density is then made in a density gradient column Bulk Density—the resin is poured via ⅞" diameter funnel into a 100 ml graduated cylinder to 100 ml line without shaking the cylinder, and weighed by difference Molecular Weight Distribution ($M_w/M_n$)—gel permeation chromatography; cross-linked polystyrene column, pore size sequence: 1 column less than 1000 Å, 3 columns of mixed $5 \times 10^7$ Å; 1,2,4-trichlorobenzene solvent at 140° C. with refractive index detection Film Rating—a sample of film is viewed with the naked eye to note the size and distribution of gels or other foreign particles in comparison to standard film samples; the appearance of the film as thus compared to the standard samples is then given a rating on a scale of $-100$ (very poor) to $+100$ (excellent)

n-hexane extractables—(FDA test used for polyethylene film intended for food contact applications); a 200 square inch sample of 1.5 mil gauge film is cut into strips measuring $1'' \times 6''$ and weighted to the nearest 0.1 mg; the strips are placed in a vessel and extracted with 300 ml of n-hexane at $50° \pm 1°$ C. for 2 hours; the extract is then decanted into tared culture dishes; after drying the extract in a vacuum desiccator the culture dish is weighed to the nearest 0.1 mg; the extractables normalized with respect to the original sample weight is then reported as the weight fraction of n-hexane extractables Stereoregularity—determined by $^{13}$CNMR; calculations follow the work of F.A. Bovey in "Polymer Conformation and Configuration", Academic Press, New York, 1969

III. SYNTHESIS

The following sets forth the synthesis for the catalysts that were used in the examples:

1. Synthesis of isopropyl(cyclopentadienyl fluorenyl)zirconium dichloride

The isopropyl(cyclopentadienyl fluorenyl)zirconium dichloride, was prepared as follows. The ligand was prepared under nitrogen by dropwise addition over a 5 minute period of 118 ml of a hexane solution of 1.6 M butyl lithium to a $-20°$ C. stirring solution of 30.6 g fluorene dissolved in 300 ml THF and contained in a 1 liter round bottom flask equipped with a side arm and a dropping funnel. The dark orange solution was slowly warmed to ambient temperature with stirring over a two hour period and during that period gas evolution ceased. The solution was cooled to $-78°$ C. and a solution of 20.4 g 6,6-dimethylfulvene dissolved in 200 ml THF was added dropwise over a 30 minute period. The red THF solution was gradually warmed to ambient temperature and stirred overnight. The solution was then mixed with 300 ml water and stirred for 10 minutes. THF was removed by rotary evaporation and the slurry was extracted with 600 ml hexane. The organic layer was separated, dried over magnesium sulfate, hexane was removed via rotary evaporation, and 31 g (70% yield) of pale yellow needles of isopropyl(cyclopentadiene-9- fluorene) were obtained by recrystallization from 300 ml of absolute ethanol. An additional 15% yield was obtained by concentrating and cooling the filtrate.

The metallocene was prepared by first generating the isopropyl(cyclopentadienyl-9-fluorenyl) dianion via dropwise syringe addition of 74 ml of a hexane solution of 1.6 M butyl lithium to a $-30°$ C. solution of 16.2 g of the ligand dissolved in 400 ml THF contained in a 500 ml round bottom flask equipped with a side arm. The solvents were removed under high vacuum, the solid red dilithio salt was cooled to $-100°$ C., and 400 ml dichloromethane was added. A slurry of 13.8 g $ZrCl_4$ in 70 ml dichloromethane was rapidly cannulated into the stirring slurry of the dianion. The mixture was stirred for 2 hours at $-100°$ C., allowed to warm slowly to ambient temperature, and stirred overnight. White LiCl, a red solid, and a red solution were separated via centrifugation. 4.7 g (18% yield) iPr[CpFlu]ZrCl$_2$ was obtained by concentrating the supernatant liquid. The red solid was extracted with dichloromethane to obtain an additional 20% yield.

2. Synthesis of diphenylmethylene (cyclopentadienyl)(fluorenyl)zirconium dichloride A solution of n-butyllithium in hexane (75 ml, 187.5 mmol) was added dropwise under nitrogen to a stirred solution of 30.45 g (183 mmol) fluorene in 225 ml THF held at ambient temperature by immersion in a cold water bath. The resulting deep red mixture was stirred for 1.5 hours.

A solution of 42.76 g (186 mmol) diphenylfulvene in 200 ml THF was added to this fluorenyl anion solution via an addition funnel. The mixture was stirred for 40 h at room temperature.

The reaction mixture was quenched by careful addition of 300 ml saturated aqueous ammonium chloride. The organic fraction was collected, combined with ether washings of the aqueous fraction, and stripped of most of the solvent on a rotary evaporator, leaving an orange slurry. 250 ml diethyl ether were added to this slurry, the mixture was filtered, and the solid washed with additional ether. The solid was dried in vacuo overnight, yielding 31.09 g of (Cyclopentadienyl)(fluorenyl) diphenylmethane (43%).

A solution of methyllithium in diethyl ether (115 ml, 161 mmol) was added dropwise to 30.98 g (78 mmol) of the (cyclopentadienyl)(fluorenyl) diphenylmethane slurried in 500 ml THF held at 0° C. Following the addition, the solution was allowed to warm to ambient temperature. After 2 hours, most of the solvents were removed from the blood-red solution in vacuo and 400 ml hexane were stirred with the red slurry overnight. The brown solid was collected on a filter and dried for 3 hours in vacuo. 38.99 g of dilithio(cyclopentadienyl)

(fluorenyl)diphenylmethane bis(tetrahydrofuran) were obtained, 90%.

16.6 g (71 mmol) solid zirconium tetrachloride under argon were slowly added to a slurry of 38.99 g (71 mmol) of dilithio(cyclopentadienyl) (fluorenyl)diphenylmethane bis(tetrahydrofuran) (71 mmol) in 250 ml hexane. The slurry was stirred at room temperature overnight. The resulting slurry was centrifuged to settle the solids. The supernatant was removed by cannula and discarded, while the solid residues were dried in vacuo for 3.25 h. The result was a mixture of diphenylmethylene(cyclopentadienyl)(fluorenyl) zirconium dichloride and lithium chloride, 45.57 g (100%).

3. Synthesis of dimethylsilylbis(indenyl) zirconium dichloride

A solution of 51 g (440 mmol) indene in 200 ml THF under $N_2$ was cooled in an ice bath. Slowly, 185 ml n-BuLi/hexanes (2.5 M) were added, turning the pale yellow solution red-brown. The solution was stirred for 2.5 hours, then cooled to −78° C. To this solution were added 27.1 g (210 mmol) dichlorodimethylsilane. The red solution was stirred for 64 hours at ambient temperature, followed by reflux for one hour. The ligand solution was washed with 0.6 M aqueous NaCl solution, separated, combined with ether washings, dried with anhydrous $MgSO_4$, filtered, and reduced in vacuo to a dark-brown oil. The oil was dissolved in 100 ml hexanes and run down a column of silica gel/hexanes. All yellow fractions were recovered and reduced to a viscous orange liquid, from which 16.5 g were removed and dissolved in 250 ml THF. To this solution were added 48 ml (120 mmol) 2.5 M n-BuLi/hexanes at 0° C. This solution was stirred at ambient temperature for 1.5 hours, turning brown-black. This solution was transferred to a flask containing 21.3 g (56 mmol) zirconium tetrachloride-THF solvate in 200 ml THF. The resulting orange-brown slurry was stirred overnight. The slurry was then reduced in vacuo to 250 ml, then combined with 700 ml dry hexanes and stirred for about 0.5 hour, resulting in a black tar at bottom. The supernatant was decanted and stripped of all solvents. The tarry orange mass was then broken up in 100 ml hexanes and stirred overnight, followed by filtration and drying. Another 1.7 g metallocene were recovered by repetition of the hexane/THF washing step. The combined yield of crude dimethylsilylbis(indenyl) zirconium dichloride: 5.0 g (20%).

EXAMPLES 1 TO 25

Figure 2:
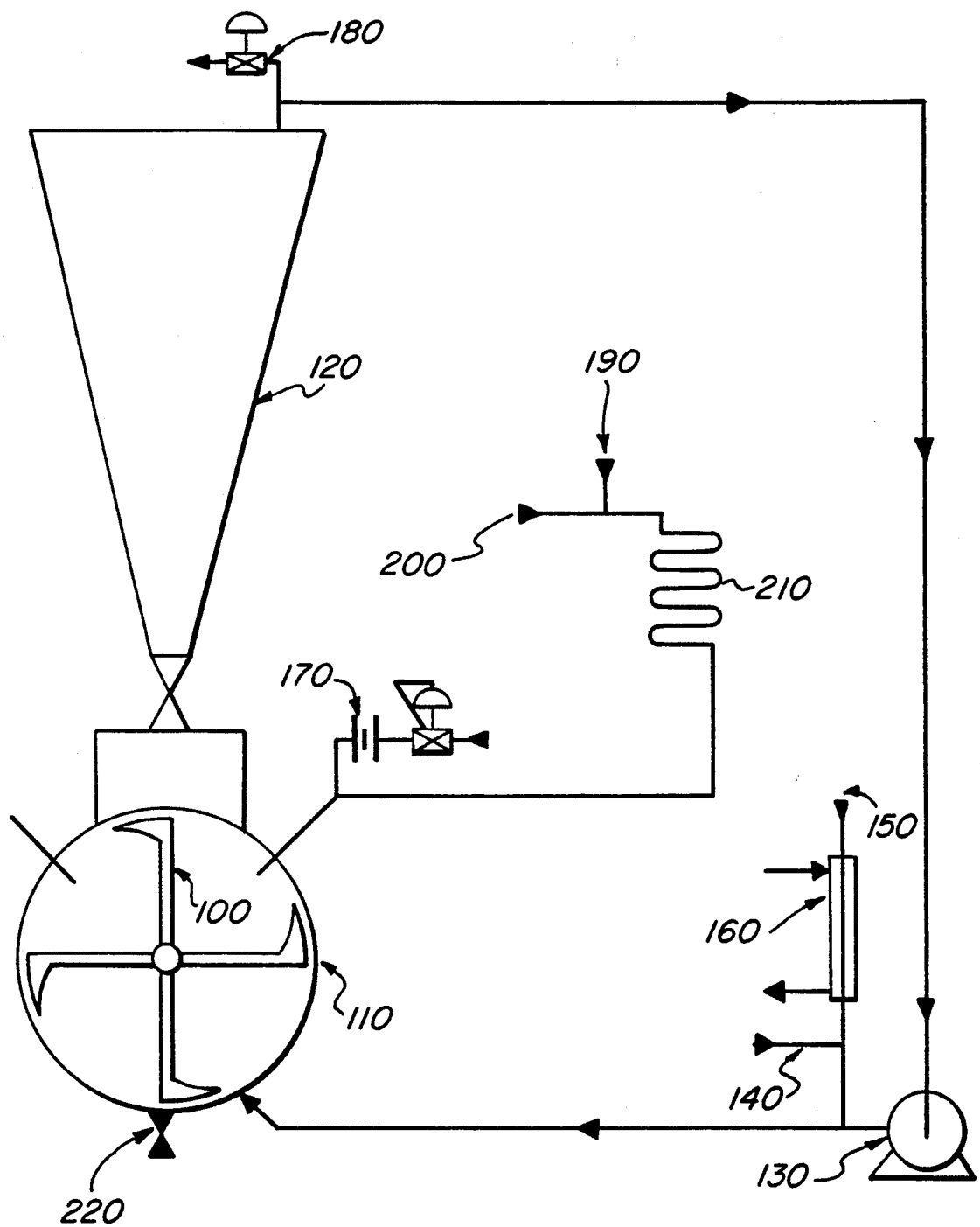
FIG. 2 is a schematic illustration of another embodiment of the present invention in which the olefin polymerization reaction may be carried out in a batch or continuous stirred bed mode of operation.

In Examples 1 to 25, polypropylene, LLDPE, EPDM and EBDM were prepared in a horizontally mixed reactor with various metallocene catalyst solutions. FIG. 2 depicts the horizontally mixed reactor system. This reactor was a two-phase (gas/solid) stirred bed, back mixed reactor. A set of four "plows" 100 were mounted horizontally on a central shaft rotating at 200 rpm to keep the particles in reactor 110 mechanically fluidized. The reactor cylinder swept by these plows measured 40.6 cm (16 in.) long by 39.7 cm (15.6 in.) in diameter, resulting in a mechanically fluidizable volume of 46 liters (1.6 ft³). The gas volume, larger than the mechanically fluidizable volume due to the vertical cylindrical chamber, totaled 54.6 liters (1.93 ft³). A disengager vessel 120 was mounted atop reactor 110. This vessel had a gas volume of 68 liters (2.41 ft³), more than doubling the gas volume of the reactor. Gas was continually recirculated through both the reactor and disengager via a blower 130, so that the gas composition was homogeneous throughout.

The reactor pressure used was typically 300–400 psig. Monomers and hydrogen (for molecular weight control) were fed to the reactor continuously via control valves through line 140. Partial pressures of monomer ranged typically between 150–300 psi. Comonomer (if any) was introduced via control valves through line 150 and vaporizer 160 and its content in the polymer was controlled by adjusting feed rates to maintain a constant comonomer/monomer molar ratio in the gas phase. Gas composition was measured at 4–6 minute intervals by a gas chromatograph analyzer. Molecular weight of the polymer was controlled by adjusting hydrogen feed rate to maintain a constant mole ratio of hydrogen to monomer in the gas phase. Nitrogen made up the majority of the balance of the composition of the gas, entering with the catalyst through line 170 and leaving via a small vent 180 with the reactor gases including volatilized solvents. The vent opening was adjusted via computer to maintain constant total pressure in the reactor.

The reactor was cooled by an external jacket of chilled glycol. The bed temperature was measured with a temperature probe in a thermowell protruding into the bed at a 60° angle below horizontal, between the inner set of plows. Reactor temperature were controlled to values in the range of 10°–110° C., although 50°–85° C. were typical for LLDPE and polypropylene production.

Solution catalyst is metered in shots via line 190 and mixed with a continuous stream of methylaluminoxane co-catalyst solution introduced via line 200. This mixture is fed through a coil 210 of ⅛" tubing where the components react for typically 2–10 minutes. Upon leaving this precontact coil, the mixed solution feed is sprayed into the reactor by a constant flow of nitrogen. This spray can be directed into the bed or above the bed, as desired.

Typical batch yields of granular polymer in this reactor are 20–25 lbs, with 30–35 lbs being the upper limit. Batch runs typically last 3–6 hours. Alternatively, the reactor can be run in continuous mode, in which granular polymer is withdrawn at 220 in typically 0.4 lb portions while the polymerization is in progress. In the continuous mode, the product discharge system is enabled after the bed weight builds to typically 15–25 lbs, and the rate of discharge is altered to maintain constant bed weight.

A typical run commences with monomers being charged to the reactor and feeds adjusted until the desired gas composition is reached. An initial charge of cocatalyst is added prior to starting catalyst feeding in order to scavenge any poisons present in the reactor. After catalyst feed starts, monomers are added to the reactor sufficient to maintain gas concentrations and ratios. As the catalyst inventory builds up, polymer production rate increases to 5–10 lbs/hr, at which point catalyst feed is adjusted to maintain constant polymer production rate. Cocatalyst feed rate is maintained in proportion to the catalyst feed rate. If a long-lived catalyst such as a metallocene is used, the catalyst and cocatalyst feeds can be turned off well before the batch weight target is achieved, since sufficient activity is often retained to continue polymerization for many hours. After the desired batch weight is made, the reactor is quickly vented, and monomers are purged from the resin with nitrogen. The batch is then discharged through valve 220 to the open atmosphere.

TABLE I

Preparation of LLDPE with bis (MeCp)$_2$ZrCl$_2$/MMAO[1]: Ethylene-Hexene Copolymers

| | Example 1 | Example 2 |
|---|---|---|
| Catalyst Injection Parameters | | |
| Catalyst Feed Rate (cc/hr) | 23.4 | 15.6 |
| Cocatalyst Feed Rate (cc/hr) | 150 | 100 |
| Nitrogen Carrier Rate (lb/hr) | 1–1.3 | 1–1.3 |
| Nitrogen Carrier Velocity (cm/sec) | 140–180 | 140–180 |
| Al/Zr (aim) | 2000 | 2000 |
| Precontact Time (min) | 7 | 10 |
| Injection Configuration | Std tube | Std tube |
| Polymerization Conditions | | |
| Temperature (°C.) | 50 | 60 |
| Total Pressure (psig) | 300 | 300 |
| Ethylene Partial Pressure (psi) | 140 | 140 |
| H$_2$/C$_2$ (molar ratio) | 0 | 0 |
| C$_6$/C$_2$ (molar ratio) | 0.022 | 0.022 |
| Polymer Measurements | | |
| MI (dg/min) | 0.30 | 0.16 |
| Density (g/cc) | 0.918 | 0.916 |
| Bulk Density (lbs/ft$^3$) | 13 | 14 |
| APS (in) | — | 0.065 |
| Yield (lb) | 10.5 | 11.7 |
| Zr Residue by ICP (ppmw) | 4.2 | 3.4 |

[1]MMAO in n-heptane

TABLE II

Preparation of LLDPE with DPZ/MMAO[1]: Ethylene-Butene Copolymers

| | Ex. 3 | Ex. 4 | Ex. 5 | Ex. 6 | Ex. 7 | Ex. 8 |
|---|---|---|---|---|---|---|
| Catalyst Injection Parameters | | | | | | |
| Catalyst Feed Rate (cc/hr) | 45.2 | 31.4 | 31.4 | 45.2 | 90.5 | 24 |
| Cocatalyst Feed Rate (cc/hr) | 66 | 91 | 137 | 66 | 66 | 10.5 |
| Nitrogen Carrier Rate (lb/hr) | 0.5 | 0.5 | 0.5 | 0.5 | 0.5 | 0.5 |
| Nitrogen Carrier Velocity (cm/sec) | 60 | 60 | 60 | 60 | 60 | 60 |
| Al/Zr (aim) | 500 | 1000 | 1500 | 500 | 250 | 1500 |
| Precontact Time (min) | 11 | 10 | 7 | 11 | 8 | 9 |
| Injection Configuration | Std tube | Std tube | Std tube | Std tube | Std tube | Std tube |
| Polymerization Conditions | | | | | | |
| Temperature (°C.) | 70 | 75 | 75 | 75 | 75 | 85 |
| Total Pressure (psig) | 350 | 350 | 350 | 350 | 350 | 350 |
| Ethylene Partial Pressure (psi) | 240 | 240 | 240 | 240 | 240 | 240 |
| H$_2$/C$_2$ (molar ratio) | 0.015 | 0 | 0.015 | 0.015 | 0.015 | 0.01 |
| C$_4$/C$_2$ (molar ratio) | 0.035 | 0.015 | 0.02 | 0.024 | 0.024 | 0.022 |
| Resin Properties | | | | | | |
| MI (dg/min) | 0.44 | NF | 3.0 | 0.7 | 0.5 | 0.7 |
| Density (g/cc) | 0.908 | 0.92 | 0.93 | 0.920 | 0.919 | 0.919 |
| Bulk Density (lbs/ft$^3$) | 20 | 23 | 27 | 26 | 20 | 27 |
| APS (in) | 0.07 | 0.05 | 0.05 | 0.07 | 0.1 | 0.06 |
| Yield (lb) | 29.5 | — | — | 25.3 | 19.2 | — |
| Zr Residue Predicted (ppmw) | 2.7 | — | — | 3.2 | 4.3 | — |

[1]MMAO in isopentane

TABLE III

Preparation of LLDPE with DPZ/MMAO[1]: Ethylene-Hexene Copolymers

| | Ex. 9 | Ex. 10 | Ex. 11 | Ex. 12 |
|---|---|---|---|---|
| Catalyst Injection Parameters | | | | |
| Catalyst Feed Rate (cc/hr) | 31.4 | 41.5 | 41.5 | 31.4 |
| Cocatalyst Feed Rate (cc/hr) | 137 | 185 | 185 | 137 |
| Nitrogen Carrier Rate (lb/hr) | 0.5 | 0.5 | 0.5 | 0.5 |
| Nitrogen Carrier Velocity (cm/sec) | 60 | 60 | 60 | 60 |
| Al/Zr (aim) | 1500 | 1400 | 1400/ | 1500 |
| Precontact Time (min) | 7 | 6 | 6 | 7 |
| Injection Configuration | Std tube | Std tube | Std tube | Std tube |
| Polymerization Conditions | | | | |
| Temperature (°C.) | 75 | 75 | 75 | 85 |
| Total Pressure (psig) | 350 | 350 | 350 | 350 |
| Ethylene Partial Pressure (psi) | 240 | 240 | 240 | 240 |
| H$_2$/C$_2$ (molar ratio) | 0.016 | 0.016 | 0.016 | 0.012 |
| C$_6$/C$_2$ (molar ratio) | 0.0053 | 0.003 | 0.003 | 0.0043 |
| Resin Properties | | | | |
| MI (dg/min) | 0.7 | 7.0 | — | 0.7 |
| Density (g/cc) | 0.913 | 0.934 | 0.937 | 0.915 |
| Bulk Density (lbs/ft$^3$) | 17 | 26 | 25 | 22 |
| APS (in) | 0.068 | 0.056 | 0.06 | 0.083 |
| Yield (lb) | 30.8 | 21.5 | 20.2 | 20.0 |
| Zr Residue by ICP (ppmw) | 1.5 | 5.1 | 4.9 | 2.2 |

[1]MMAO in isopentane

TABLE IV

Effect of Nozzle Configuration on LLDPE Production Using DPZ/MMAO[1]: Ethylene-Hexene Copolymers

| | Ex. 13 | Ex. 14 | Ex. 15 |
|---|---|---|---|
| Catalyst Injection Parameters | | | |
| Catalyst Feed Rate (cc/hr) | 41.6 | 41.6 | 41.6 |
| Cocatalyst Feed Rate (cc/hr) | 185 | 185 | 185 |
| Nitrogen Carrier Rate (lb/hr) | 0.5 | 0.25/3.5 | 0.25/3.5 |
| Nitrogen Carrier Velocity (cm/sec) | — | — | 30/420 |
| Al/Zr (aim) | 1400 | 1400 | 1400 |
| Precontact Time (min) | 6 | 6 | 6 |
| Injection Configuration | Nozzle | Nozzle/Pulse | Tube/Pulse |
| Polymerization Conditions | | | |
| Temperature (°C.) | 75 | 75 | 75 |
| Total Pressure (psig) | 350 | 350 | 350 |
| Ethylene Partial Pressure (psi) | 240 | 240 | 240 |
| H$_2$/C$_2$ (molar ratio) | 0.01 | 0.01 | 0.01 |
| C$_6$/C$_2$ (molar ratio) | 0.005 | 0.006 | 0.006 |
| Resin Properties | | | |
| MI (dg/min) | 3.5 | 2.8 | 2.0 |
| Density (g/cc) | 0.927 | 0.923 | 0.924 |
| Bulk Density (lbs/ft$^3$) | 23 | 20 | 15 |

TABLE IV-continued

Effect of Nozzle Configuration on LLDPE Production Using DPZ/MMAO[1]: Ethylene-Hexene Copolymers

| | Example | | |
|---|---|---|---|
| | 13 | 14 | 15 |
| APS (in) | 0.065 | 0.069 | 0.08 |
| Yield (lb) | 23.8 | 23.0 | 23.5 |
| Zr Residue Predicted (ppmw) | 4.0 | 4.0 | 3.8 |

[1]MMAO in isopentane

TABLE V

Preparation of EPDM (EBDM) with DPZ/MMAO[1]

| | Example | | | |
|---|---|---|---|---|
| | 16 | 17 | 18 | 19 (EBDM) |
| Catalyst Injection Parameters | | | | |
| Catalyst Feed Rate (cc/hr) | 60 | 45.2 | 45.2 | 72 |
| Cocatalyst Feed Rate (cc/hr) | 182 | 133 | 133 | 211 |
| Nitrogen Carrier Rate (lb/hr) | 0.5 | 0.5 | 0.5 | 0.5 |
| Nitrogen Carrier Velocity (cm/sec) | 60 | 60 | 52 | 52 |
| Al/Zr (aim) | 1000 | 1000 | 1000 | 1000 |
| Precontact Time (min) | 3.3 | 4.3 | 4.3 | 2.7 |
| Injection Configuration | Std tube | Std tube | Std tube | Std tube |
| Polymerization Conditions | | | | |
| Temperature (°C.) | 40 | 50 | 55 | 50 |
| $C_3/C_2$ (molar ratio) | 0.08 | 0.079 | 0.11–0.108 | 0.12–0.045 $C_4$ |
| ENB Fed (wt %) | 3.5 | 3.8 | 6.7 | 3.3 |
| Carbon Black (wt %) | 23 | 25 | 28 | 15 |
| Polymer Measurements | | | | |
| FI (dg/min) | 33 | 36 | 51 | 7.5 |
| $C_3$ (wt %) | 18 | 15 | 21 | 19 $C_4$ |
| ENB (wt %) | 2.4 | 3.1 | 4.2 | 3.5 |
| Yield (lb) | 17.3 | 16.1 | 14.5 | 19.7 |
| Zr Residue Predicted (ppmw) | 21 | 22 | 20 | 14 |

[1]MMAO in isopentane

TABLE VI

Preparation[1] of Syndiotactic Polypropylene (sPP) with iPrCp(Flu)ZrCl$_2$/MMAO[2]

| | Example 20 |
|---|---|
| Catalyst Injection Parameters | |
| Catalyst Feed Rate (cc/hr) | 31.5 |
| Cocatalyst Feed Rate (cc/hr) | 202 |
| Nitrogen Carrier Rate (lb/hr) | 0.8–1 |
| Nitrogen Carrier Velocity (cm/sec) | 110–140 |
| Al/Zr (aim) | 1600/1780 |
| Precontact Time (min) | 5 |
| Injection Configuration | Std tube |
| Polymerization Conditions | |
| Temperature (°C.) | 60 |
| Total Pressure (psig) | 300 |
| Propylene Partial Pressure (psi) | 225 |
| $H_2/C_3$ (molar ratio) | 0 |
| Polymer Measurements | |
| MF (dg/min) | 132 |
| Bulk Density (lbs/ft$^3$) | 25 |
| APS (in) | 0.09 |
| Yield (lb) | 26 |
| Zr Residue by ICP (ppmw) | 2.3 |

[1]Initial Polymer Bed of sPP
[2]MMAO in heptane

TABLE VII

Preparation (No Pre-Bed) of Syndiotactic Polypropylene (sPP) with iPrCp(Flu)ZrCl$_2$/MMAO[1]

| | Example | | | |
|---|---|---|---|---|
| | 21 | 22 | 23 | 24 |
| Catalyst Injection Parameters | | | | |
| Catalyst Feed Rate (cc/hr) | 31.5 | 31.5 | 31.5 | 15.6–22 |
| Cocatalyst Feed Rate (cc/hr) | 253 | 202 | 202 | 141–202 |
| Nitrogen Carrier Rate (lb/hr) | 0.8–1 | 0.8–1 | 0.8–1 | 1.3 |
| Nitrogen Carrier Velocity (cm/sec) | 110–140 | 110–140 | 110–140 | 180 |
| Al/Zr (aim) | 2000/1625 | 1600/1450 | 1600/1460 | 1600/— |
| Precontact Time (min) | 4 | 5 | 5 | 5–7 |
| Injection Configuration | Std tube | Std tube | Std tube | Std tube |
| Polymerization Conditions | | | | |
| Temperature (°C.) | 25 | 50 | 60 | 70 |
| Total Pressure (psig) | 300 | 300 | 300 | 300 |
| Propylene Partial Pressure (psi) | 120 | 210 | 225 | 225 |
| $H_2/C_3$ (molar ratio) | 0 | 0 | 0 | 0 |
| Polymer Measurements | | | | |
| MF (dg/min) | 35 | 82 | 60 | 351 |
| Bulk Density (lbs/ft$^3$) | | 14 | 25 | 2631 |
| APS (in) | 0.06 | 0.10 | 0.07 | 0.07 |
| Yield (lb) | 18 | 25 | 25 | 23 |
| Zr Residue by ICP (ppmw) | 6.6 | 2.5 | 2.1 | 3.2 |

[1]MMAO in heptane

TABLE VIII

Preparation (No Pre-Bed) of Isotactic Polypropylene (iPP) with Me$_2$Si(Ind)$_2$ZrCl$_2$/MMAO[1]

| | Example 25 |
|---|---|
| Catalyst Injection Parameters | |
| Catalyst Feed Rate (cc/hr) | 8.4–10.8 |
| Cocatalyst Feed Rate (cc/hr) | 250 |
| Nitrogen Carrier Rate (lb/hr) | 1–1.3 |
| Nitrogen Carrier Velocity (cm/sec) | 140–180 |
| Al/Zr (aim/ICP) | 1500/2000 |
| Precontact Time (min) | 4.5 |
| Injection Configuration | Std tube |
| Polymerization Conditions | |
| Temperature (°C.) | 50 |
| Total Pressure (psig) | 300 |
| Propylene Partial Pressure (psi) | 210 |
| $H_2/C_3$ (molar ratio) | 0 |
| Polymer Measurements | |
| MF (dg/min) | >1000 |

TABLE VIII-continued

Preparation (No Pre-Bed) of Isotactic Polypropylene (iPP) with Me$_2$Si(Ind)$_2$ZrCl$_2$/MMAO[1]

|  | Example 25 |
|---|---|
| Bulk Density (lbs/ft$^3$) | 23 |
| APS (in) | 0.04 |
| Yield (lb) | 6.7 |
| Zr Residue Predicted (ppmw) | 12 |

[1]MMAO in n-heptane

EXAMPLES 26 TO 28

In Examples 26 through 28, LLDPE was prepared in a fluid bed reactor with DPZ solutions. FIG. 1 depicts the reaction system employed for these examples. The reactor had a lower section 10 feet high and 13.5 inches in inner diameter and an upper section which was 16 feet high and 23.5 inches in inner diameter. The orange 7 millimolar solution of DPZ catalyst in methylene chloride and the colorless 2 molar cocatalyst solution of Akzo MMAO Type 3A in isopentane were fed with a syringe pumps through a coil of ⅛" tubing. The components typically reacted for two minutes in this precontact coil. Upon leaving this coil, the purple mixed solution feed was sprayed into the reactor by a constant flow of nitrogen and isopentane. This spray was directed into different places in the bed or above the bed, as desired. A 5% solution of TIBA was fed separately into the bed at a level of four feet above the gas distributor plate.

and in an unsupported liquid form to demonstrate that the activity of the catalytically active reaction product is greater when utilized in the unsupported liquid form, in accordance with the present invention.

EXAMPLE 29—COMPARATIVE EXAMPLE

Preparation of Supported iPrCp(Flu)ZrCl$_2$ and MAO on Silica

In a Vacuum Atmospheres dry box, 0.0171 g iPrCp(Flu)ZrCl$_2$ was dissolved in 14.5 g distilled toluene. 11.3 g of the orange solution (0.0308 mmol Zr) was added to 17 ml of a colorless toluene solution of methyl aluminoxane (30.6 mmol Al) obtained from Ethyl Corporation. The resulting purple solution was stirred for 5 min, then added to 20.04 g Davison 955 silica which had been dehydrated at 600° C. The mixture was stirred to yield a free-flowing material, then evacuated at 0.3 mm Hg for 2.5 hours. A pink solid weighing 21.2 g was recovered (0.00145 mmol Zr/g and 1.4 mmol Al/g).

Liquid Propylene Polymerization of Supported iPrCp(Flu)ZrCl$_2$ and MAO on Silica In a Vacuum Atmospheres dry box, 2.06 g (0.00299 mmol Zr) of the supported iPrCp(Flu)ZrCl$_2$ and MAO on silica was added to a stirring solution consisting of 20 ml distilled toluene and 0.5 ml of a toluene solution of MAO (1.8 M in Al).

A one-liter stirred autoclave reactor was dried by heating at a temperature of greater than 96° C. under a stream of nitrogen for 20 min. After cooling the reactor

TABLE IX

LLDPE Preparation in a Fluid Bed Reactor with DPZ Solutions

|  | Example 26 | Example 27 | Example 28 |
|---|---|---|---|
| Catalyst Injection Parameters | | | |
| DPZ Feed (cc/hr) | 50 | 50 | 100 |
| MMAO Feed (cc/hr) | 150 | 150 | 200 |
| TIBA Feed (cc/hr) | 244 | 284 | 623 |
| MMAO Al/Zr | 1095 | 1095 | 727 |
| TIBA Al/Zr | 246 | 287 | 367 |
| N2 Carrier Feed Rate (lb/hr) | 1 | 2.5 | 2 |
| N2 Carrier Velocity (cm/sec) | 185 | 462 | 370 |
| iC5 Carrier Feed Rate (lb/hr) | 2 | 3.5 | 3 |
| Liquid Velocity (cm/sec) | 19 | 32 | 29 |
| Configuration | straight tube into bed 1 ft level) | Tube with angled orifice shot into top of bed (8 ft level)[1] | straight tube into bed (1 ft level) |
| Polymerization Conditions | | | |
| Temperature (/C.) | 80 | 80 | 65 |
| Pressure (psig) | 350 | 350 | 370 |
| C2 Part. Pres. (psia) | 250 | 250 | 250 |
| C6/C2 | 0.0035 | 0.0035 | 0 |
| H2/C2 | 0.015 | 0.015 | .010–.015 |
| Bed Weight (lbs.) | 98 | 117 | 113 |
| Fluidized Bulk Density (lb/ft3) | 10 to 12 | 12 | 12 to 16 |
| Production rate (lb/hr) | 23 | 25 | 12 |
| Catalyst Residence Time (hr) | 4.4 | 4.7 | 9.4 |
| Superficial Vel. (ft/sec) | ~1.7 | ~1.7 | ~1.7 |
| Polymer Measurements | | | |
| MI (dg/min) | 0.57 | 1.78 | 3.45 |
| Density (g/cc) | 0.92 | 0.923 | 0.954 |
| Bulk Density (lb/ft3) | 19.6 | 20.7 | 33 |
| APS (inches) | 0.09 | 0.06 | 0.03 |
| Zr Residue Predicted (ppm) | 3.1 | 2.8 | 12 |

[1]Straight tube having a plugged end and a 45° angled side opening.

EXAMPLES 29 AND 30

Examples 29 and 30 set forth a comparison of preparing polyolefin resin using the reaction product of iPrCp(Flu)ZrCl$_2$ and MAO when on a silica support to 21° C., the slurry containing the supported catalyst was transferred to the reactor via cannula followed by 800 ml of liquid propylene. The reactor was sealed, stirred at 22° C. for five min, then heated to 83° C. for an instant, followed by a 30 minute polymerization at 40° C. 6.63 g of product was obtained which corresponds to 31% silica and an activity of 1530 g sPP/mmol Zr.

EXAMPLE 30

Liquid Propylene Polymerization of iPrCp(Flu)ZrCl$_2$

In a Vacuum Atmospheres dry box, 0.0143 g (0.0331 mmol Zr) iPrCp(Flu)ZrCl$_2$ was dissolved in 12.39 g distilled toluene. 0.9714 g of this solution (0.00259 mmol Zr) and 1.5 MAO (2.70 mmol) were stirred for 5 min.

A one-liter stirred autoclave reactor was dried by heating at a temperature of greater than 96° C. under a stream of nitrogen for 20 min. After cooling the reactor to 21° C., the slurry containing the catalyst in liquid form was transferred to the reactor via syringe followed by 800 ml of liquid propylene. The reactor was sealed, stirred at 22° C. for 5 min, then heated to 66° C. for an instant, followed by a 30 minute polymerization at 40° C. 34.83 g of product was obtained, corresponding to an activity of 13,400 g sPP/mmol Zr, an activity value which is about 9 times greater than that obtained in Comparative Example 29 where the same catalyst was used on a support.

What is claimed is:

1. A process for producing polymer in a gas phase polymerization reaction which comprises:
   a) continuously introducing a gaseous stream comprising one or more monomers having from two to twelve carbon atoms into a reaction zone;
   b) introducing an unsupported polymerization catalyst having a droplet size in the range of from about 1 to about 1,000 microns comprising (i) a transition metal compound selected from Groups IIIB to VIII and (ii) an organometallic compound wherein (i) and (ii) are in liquid form; and
   c) withdrawing polymeric product from said reaction zone.

2. A process for producing polymer in a gas phase polymerization reaction which comprises:
   a) continuously introducing a gaseous stream comprising one or more monomers having from two to twelve carbon atoms into a reaction zone;
   b) introducing an unsupported polymerization catalyst having a droplet size in the range of from about 1 to about 1,000 microns comprising a solution of the reaction product of a transition metal compound selected from Groups IIIB to VIII and an organometallic compound; and
   c) withdrawing polymer product from said reaction zone.

3. The process of claim 1, wherein the one or more monomers are alpha-olefins and the polymer product is comprised of polyolefins.

4. The process of claim 2, wherein the one or more monomers are alpha-olefins and the polymer product comprised of polyolefins.

5. The process of claim 1, wherein the transition metal compound is comprised of one or more titanium, vanadium, zirconium, hafnium or chromium compounds or a mixture thereof.

6. The process of claim 2, wherein the transition metal compound is comprised of one or more titanium, vanadium, zirconium, hafnium or chromium compounds or a mixture thereof.

7. The process of claim 1, wherein the organometallic compound is comprised of one or more compounds of the general formula:

$$M^3M^4_vX^2_cR^3_{b-c} \qquad (V)$$

wherein $M^3$ is a metal of Groups IA, IIA and IIIA of the periodic table; $M^4$ is a metal of Group IA of the periodic table; v is a number from 0 to 1; each $X^2$ is any halogen; c is a number from 0 to 3; each $R^2$ is a monovalent hydrocarbon radical or hydrogen; b is a number from 1 to 4; and wherein b-c is at least 1.

8. The process of claim 2, wherein the organometallic compound is comprised of one or more compounds of the general formula:

$$M^3M^4_vX^2_cR^3_{b-c} \qquad (V)$$

wherein $M^3$ is a metal of Groups IA, IIA and IIIA of the periodic table; $M^4$ is a metal of Group IA of the periodic table; v is a number from 0 to 1; each $X^2$ is any halogen; c is a number from 0 to 3; each $R^2$ is a monovalent hydrocarbon radical or hydrogen; b is a number from 1 to 4; and wherein b-c is at least 1.

9. A process for producing polyolefins by a gas phase polymerization reaction in a reaction zone which comprises:
   a) continuously introducing a gaseous stream comprising one or more alpha-olefin monomers having from two to twelve carbon atoms into said reaction zone;
   b) introducing an unsupported olefin polymerization catalyst into said reaction zone comprising (i) at least one metallocene compound containing a transition metal selected from Groups IIIB to VIII and (ii) aluminoxane wherein (i) and (ii) are in liquid form; and
   c) withdrawing polyolefin product from said reaction zone.

10. A process for producing polyolefins by a gas phase polymerization reaction in a reaction zone which comprises:
    a) continuously introducing a gaseous stream comprising one or more alpha-olefin monomers having from two to twelve carbon atoms into said reaction zone;
    b) introducing an unsupported olefin polymerization catalyst into said reaction zone comprising a solution of the reaction product of a metallocene compound containing a transition metal selected from Groups IIIB to VIII and aluminoxane; and
    c) withdrawing polyolefin product from said reaction zone.

11. The process of claim 9, wherein the metallocene compound is represented by the formula:

$$(C_5R_x)_yR'_z(C_5R_m)MQ_{n-y-1} \qquad (I)$$

wherein:
   M is a metal of Groups III to VIII of the Periodic Table of the Elements;
   $(C_5R_x)$ and $(C_5R_m)$ are the same or different cyclopentadienyl or substituted cyclopentadienyl groups bonded to M;
   R is the same or different and is hydrogen or a hydrocarbyl radical such as alkyl, alkenyl, aryl, alkylaryl, or arylalkyl radical containing from 1 to 20 carbon atoms or two carbon atoms are joined together to form a $C_4$-$C_6$ ring;

R' is a $C_1$-$C_4$ substituted or unsubstituted alkylene radical, a dialkyl or diaryl germanium or silicon, or an alkyl or aryl phosphine or amine radical bridging two ($C_5R_x$) and ($C_5R_m$) rings;

Q is a hydrocarbyl radical such as aryl, alkyl, alkenyl, alkylaryl, or aryl alkyl having from 1-20 carbon atoms, hydrocarboxy radical having from 1-20 carbon atoms or halogen and can be the same or different from each other;

z is 0 or 1; y is 0, 1 or 2; z is 0 when y is 0; n is 0, 1, 2, 3, or 4 depending upon the valence state of M; and $n - y \geq 1$.

12. The process of claim 10, wherein the metallocene compound is represented by the formula:

$$(C_5R_x)_y R'_z (C_5R_m) M Q_{n-y-1} \quad (I)$$

wherein:

M is a metal of Groups III to VIII of the Periodic Table of the Elements;

($C_5R_x$) and ($C_5R_m$) are the same or different cyclopentadienyl or substituted cyclopentadienyl groups bonded to M;

R is the same or different and is hydrogen or a hydrocarbyl radical such as alkyl, alkenyl, aryl, alkylaryl, or arylalkyl radical containing from 1 to 20 carbon atoms or two carbon atoms are joined together to form a $C_4$-$C_6$ ring;

R' is a $C_1$-$C_4$ substituted or unsubstituted alkylene radical, a dialkyl or diaryl germanium or silicon, or an alkyl or aryl phosphine or amine radical bridging two ($C_5R_x$) and ($C_5R_m$) rings;

Q is a hydrocarbyl radical such as aryl, alkyl, alkenyl, alkylaryl, or aryl alkyl radical having from 1-20 carbon atoms, hydrocarboxy radical having from 1-20 carbon atoms or halogen and can be the same or different from each other;

z is 0 or 1; y is 0, 1 or 2; z is 0 when y is 0; n is 0, 1, 2, 3, or 4 depending upon the valence state of M; and $n - y \geq 1$.

13. The process of claim 9, wherein the droplet size of the polymerization catalyst introduced into the reaction zone is in the range of from about 1 to about 1,000 microns.

14. The process of claim 10, wherein the droplet size of the polymerization catalyst introduced into the reaction zone is in the range of from about 1 to about 1,000 microns.

15. A process for producing polymer from monomer in a gas fluidized bed reactor having a reaction zone containing a bed of growing polymer particles, a lower gas diffusion zone, an upper reduced gas velocity zone, a gas inlet into said gas diffusion zone, and a gas outlet above said reduced gas velocity zone which comprises:

a) continuously passing a gaseous stream containing monomer through said gas diffusion zone and into said reaction zone with an upward velocity sufficient to maintain said particles in a suspended and gas fluidized condition;

b) introducing an unsupported catalyst range of from about 1 to about 1,000 microns into said reaction zone;

c) withdrawing polymer product from said reaction zone;

d) continuously withdrawing a stream of unreacted gases comprising monomer from said reaction zone, compressing and cooling said stream; and e) continuously introducing said stream into said gas diffusion zone.

16. The process of claim 15, wherein the catalyst in liquid form comprise a transition metal compound selected from Groups IIIB to VIII and an organometallic compound.

17. The process of claim 15, wherein the catalyst in liquid form comprises the reaction product of a transition metal compound selected from Groups IIIB to VIII and an organometallic compound.

18. The process of claim 15, wherein the catalyst in liquid form comprises (i) at least one metallocene compound containing a transition metal selected from Groups IIIB to VIII and aluminoxane, (ii) the reaction product thereof, or a mixture of (i) and (ii).

19. A process for producing polymer from monomer in a gas fluidized bed reactor having a reaction zone containing a bed of growing polymer particles, a lower gas diffusion zone, an upper reduced gas velocity zone, a gas inlet into said gas diffusion zone, and a gas outlet above said reduced gas velocity zone which comprises:

a) continuously passing a gaseous stream containing monomer through said gas diffusion zone and into said reaction zone with an upward velocity sufficient to maintain said particles in a suspended and gas fluidized condition;

b) introducing an unsupported catalyst growing particles within said reaction zone having a droplet size in the range of from about 1 to about 1,000 microns and having a concentration in the range of from about 0.01 to about 10,000 millimoles/liter;

c) withdrawing polymer product from said reaction zone having a particle size within the range of from about 500 to about 5,000 microns;

d) continuously withdrawing a stream of unreacted gases comprising monomer from said reaction zone, compressing and cooling said stream; and e) continuously introducing said stream into said gas diffusion zone.

20. The process of claim 19, wherein said liquid catalyst is introduced directly into said bed of growing particles in the form of droplets ranging in size from about 50 to about 500 microns.

* * * * *

UNITED STATES PATENT AND TRADEMARK OFFICE
CERTIFICATE OF CORRECTION

PATENT NO. : 5,317,036
DATED : May 31, 1994
INVENTOR(S) : R.C. Brady, III et al.

It is certified that error appears in the above-identified patent and that said Letters Patent is hereby corrected as shown below:

Col. 31, line 34 (Claim 1, line 7), before "having" insert --into said reaction zone--.

Col. 31, line 47 (Claim 2, line 7), before "having" insert --into said reaction zone--.

Col. 34, line 8 (Claim 15, line 12), after "catalyst", insert --in liquid form having a droplet size in the--.

Col. 34, line 42 (Claim 19, line 12), after "catalyst" insert --in liquid form directly into said bed of--.

Signed and Sealed this

Fourth Day of October, 1994

Attest:

BRUCE LEHMAN

Attesting Officer

Commissioner of Patents and Trademarks